(12) United States Patent
Watanabe

(10) Patent No.: US 11,101,071 B2
(45) Date of Patent: Aug. 24, 2021

(54) CHIP CAPACITOR AND MANUFACTURING METHOD THEREOF

(71) Applicant: ROHM CO., LTD., Kyoto (JP)

(72) Inventor: Keishi Watanabe, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 6 days.

(21) Appl. No.: 16/677,591

(22) Filed: Nov. 7, 2019

(65) Prior Publication Data

US 2020/0152380 A1    May 14, 2020

(30) Foreign Application Priority Data

Nov. 13, 2018  (JP) .............................. JP2018-213218

(51) Int. Cl.
| *H01G 4/012* | (2006.01) |
| *H01G 4/30* | (2006.01) |
| *H01G 4/228* | (2006.01) |
| *H01G 4/06* | (2006.01) |

(52) U.S. Cl.
CPC ............... *H01G 4/012* (2013.01); *H01G 4/06* (2013.01); *H01G 4/228* (2013.01); *H01G 4/306* (2013.01)

(58) Field of Classification Search
None
See application file for complete search history.

(56) References Cited

U.S. PATENT DOCUMENTS

| 2005/0074627 | A1* | 4/2005 | Ichiyanagi | ............. H01G 4/228 428/689 |
| 2006/0157792 | A1* | 7/2006 | Konushi | ................ H01G 4/306 257/359 |
| 2008/0186654 | A1* | 8/2008 | Takeshima | ............. H01G 4/232 361/313 |
| 2015/0034981 | A1* | 2/2015 | Tamagawa | ............ H01L 25/105 257/93 |
| 2015/0305159 | A1* | 10/2015 | Yamamoto | ............... H01G 4/40 361/767 |
| 2016/0351556 | A1* | 12/2016 | Nakaiso | ................ B81B 7/0022 |
| 2017/0040278 | A1* | 2/2017 | Hattori | .................... H01L 24/17 |
| 2017/0309404 | A1* | 10/2017 | Watanabe | ................ H01G 4/33 |
| 2017/0338039 | A1* | 11/2017 | Lim | ........................ H01G 4/33 |
| 2018/0068796 | A1* | 3/2018 | Seo | ......................... H01G 4/30 |
| 2018/0068798 | A1* | 3/2018 | Lee | ...................... H01G 4/1245 |
| 2018/0144871 | A1* | 5/2018 | Kang | ...................... H01G 4/236 |
| 2018/0144872 | A1* | 5/2018 | Shin | ....................... H01G 4/306 |

FOREIGN PATENT DOCUMENTS

JP            2006347782 A    12/2006

* cited by examiner

*Primary Examiner* — Dion Ferguson

(74) *Attorney, Agent, or Firm* — Rabin & Berdo, P.C.

(57) ABSTRACT

The present disclosure provides a chip capacitor, including: a first capacitor unit formed over a substrate and including a first lower electrode, first dielectric layer and first upper electrode; a second insulating layer over the first capacitor unit; a second conductive layer over the second insulating layer, and includes a first wiring portion and a second wiring portion, the first wiring portion being connected to the first lower electrode by a first contact via and connected to a first pad by a third contact via, the second wiring portion being connected to the first upper electrode by a second contact via and connected to a second pad by a fourth contact via; a first external electrode connected to the first wiring portion; and a second external electrode connected to the second wiring portion.

13 Claims, 21 Drawing Sheets

CHIP CAPACITOR AND MANUFACTURING METHOD THEREOF

BACKGROUND OF THE INVENTION

Field of the Invention

The present disclosure relates to a chip capacitor and a method of manufacturing the chip capacitor.

Description of the Prior Art

Citation Document 1 discloses a laminated ceramic capacitor. The laminated ceramic capacitor includes a dielectric ceramic layer, internal electrodes separated by the dielectric ceramic layer to generate electrostatic capacitance, and external electrodes connected to the internal electrodes.

PRIOR ART DOCUMENT

Citation Document

[Citation Document 1] Japanese Publication No. 2006-347782.

SUMMARY OF THE INVENTION

The objective of the present disclosure is to provide a chip capacitor and a method of manufacturing the chip capacitor to enhance its manufacturing efficiency and reduce its costs.

Technical Means to Solve Problems

In an embodiment of the present disclosure, a chip capacitor comprises: a substrate; a first conductive layer formed on the substrate and comprising a first pad and a second pad which are separated from each other; a first insulating layer covering the first conductive layer, a first capacitor unit over the first insulating layer and in a capacitor region between the first pad and the second pad, comprising a first lower electrode, a first dielectric layer covering the first lower electrode, and a first upper electrode over the first dielectric layer; a second insulating layer over the first capacitor unit, covering the first upper electrode; a second conductive layer over the second insulating layer, comprising: a first wiring portion and a second wiring portion, the first wiring portion penetrating the second insulating layer and the first dielectric layer to be connected to the first lower electrode and penetrating the second insulating layer, the first dielectric layer and the first insulating layer to be connected to the first pad, and the second wiring portion penetrating the second insulating layer to be connected to the first upper electrode and penetrating the second insulating layer, the first dielectric layer and the first insulating layer to be connected to the second pad; a first external electrode disposed on the first pad and electrically connected to the first wiring portion; and a second external electrode disposed on the second pad and electrically connected to the second wiring portion.

The chip capacitor is manufactured by a method of manufacturing a chip capacitor according to an embodiment of the present disclosure.

The method of manufacturing the chip capacitor, comprising steps of: forming on a substrate a first conductive layer having a first pad and a second pad which are separated from each other, forming a first insulating layer to cover the first conductive layer; forming a first capacitor unit on the first insulating layer and in a capacitor region between the first pad and the second pad, wherein the first capacitor unit comprises: a first lower electrode, a first dielectric layer covering the first lower electrode, and a first upper electrode on the first dielectric layer; forming a second insulating layer on the first capacitor unit to cover the first upper electrode; simultaneously forming a first contact via penetrating the second insulating layer and the first dielectric layer for exposing the first lower electrode, a second contact via penetrating the second insulating layer for exposing the first upper electrode, a third contact via penetrating the second insulating layer, the first dielectric layer and the first insulating layer for exposing the first pad, and a fourth contact via penetrating the second insulating layer, the first dielectric layer and the first insulating layer for exposing the second pad; forming a second conductive layer on the second insulating layer, wherein the second conductive layer comprises: a first wiring portion, connected to the first lower electrode by the first contact via and connected to the first pad by the third contact via; and a second wiring portion, connected to the first upper electrode by the second contact via and connected to the second pad by the fourth contact via; forming a first external electrode on the first pad so as for the first external electrode to be electrically connected to the first wiring portion; and forming a second external electrode on the second pad so as for the second external electrode to be electrically connected to the second wiring portion.

According to the method, with the first~fourth contact vias being simultaneously formed, the number of the manufacturing steps is minimized despite the increase in the number of the conductive layers and insulating layers on the substrate. Conventionally, it is needed to increase the number of the manufacturing steps by three, for example, performing photolithography→etching→striping the photoresist in response to an increase in the layer number by one. By contrast, the method of the present disclosure addressed with the aforesaid need, alleviating the increase of required processing steps.

Regarding the chip capacitor according to an embodiment of the present disclosure, the first lower electrode comprises: a first capacitor region facing the first upper electrode; and a first connection region extending from the first capacitor region toward a first direction parallel to a surface of the substrate, wherein the first wiring portion is connected to the first connection region.

Regarding the chip capacitor according to an embodiment of the present disclosure, the first upper electrode comprises: a second capacitor region facing the second conductive layer; and a second connection region extending from the second capacitor region toward a second direction opposite to the first direction, wherein the second wiring portion is connected to the second connection region.

Regarding the chip capacitor according to an embodiment of the present disclosure, the first capacitor region of the first lower electrode has an area greater than the second capacitor region of the first upper electrode.

The chip capacitor according to an embodiment of the present disclosure comprises: a second capacitor unit comprising: a second lower electrode including a portion of the second conductive layer; a second dielectric layer covering the second lower electrode; and a second upper electrode over the second dielectric layer; a third insulating layer over the second capacitor unit, covering the second upper electrode; and a third conductive layer over the third insulating layer, comprising: a third wiring portion penetrating the third insulating layer and the second dielectric layer to be connected to the second lower electrode, and penetrating the third insulating layer and the second dielectric layer to be connected to the first wiring portion; and a fourth wiring portion penetrating the third insulating layer to be connected to the second upper electrode and penetrating the third insulating layer and the second dielectric layer to be connected to the second wiring portion.

Regarding the chip capacitor according to an embodiment of the present disclosure, the first wiring portion of the first capacitor unit and the third wiring portion of the second capacitor unit are configured not to overlap when viewed in a third direction perpendicular to a surface of the substrate.

Regarding the chip capacitor according to an embodiment of the present disclosure, the second wiring portion of the first capacitor unit and the fourth wiring portion of the second capacitor unit are configured not to overlap when viewed in a third direction perpendicular to a surface of the substrate.

Regarding the chip capacitor according to an embodiment of the present disclosure, at least one of the first external electrode and the second external electrode has an upper surface comprising a plurality of dents recessing toward a surface of the substrate.

Regarding the chip capacitor according to an embodiment of the present disclosure, the dents are arranged in a matrix.

The chip capacitor according to an embodiment of the present disclosure further comprises a surface insulating film formed on a surface of the substrate in such a manner as to cover the second conductive layer and integrally cover a lateral side of the substrate.

The chip capacitor according to an embodiment of the present disclosure further comprises: a surface insulating film on a surface of the substrate, covering the second conductive layer and integrally covering a lateral side of the substrate; and a surface protective film covering the surface insulating film on the surface of the substrate, wherein each of the first external electrode and the second external electrode comprises a first protrusion and a second protrusion protruding from a surface of the surface protective film.

Regarding the chip capacitor according to an embodiment of the present disclosure, when viewed in a third direction perpendicular to the surface of the substrate, the first protrusion and the second protrusion are configured to cover a lamination structure of the first insulating layer, the first dielectric layer and the second insulating layer and extend from above the first pad and the second pad, respectively, to an inner region of the substrate.

Regarding the chip capacitor according to an embodiment of the present disclosure, the surface insulating film is $SiO_2$ film or SiN film, and the surface protective film is polyimide film.

Regarding the chip capacitor according to an embodiment of the present disclosure, the first external electrode and the second external electrode each comprise a plating layer formed by plating growth.

Regarding the method of manufacturing the chip capacitor according to an embodiment of the present disclosure, the first contact via, the second contact via, the third contact via and the fourth contact via are formed by dry etching.

BRIEF DESCRIPTION OF THE DRAWINGS

FIG. 6O shows the next step of FIG. 6N.

DETAILED DESCRIPTION OF THE EMBODIMENTS

Embodiments of the present disclosure are hereunder described with reference made to the accompanying diagrams.

Figure 1:
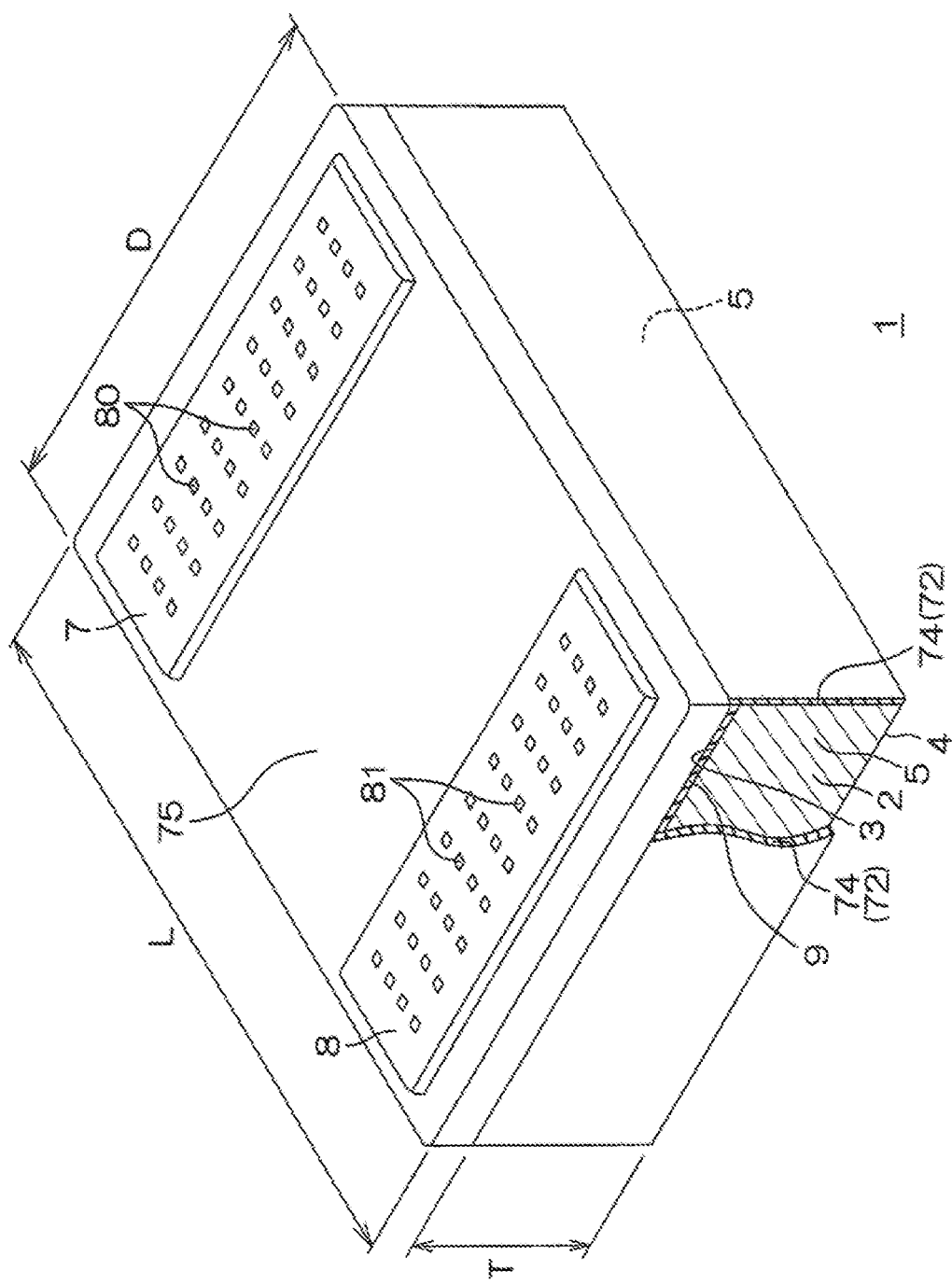
FIG. 1 is a schematic perspective view of a chip capacitor according to an embodiment of the present disclosure.
Figure 2:
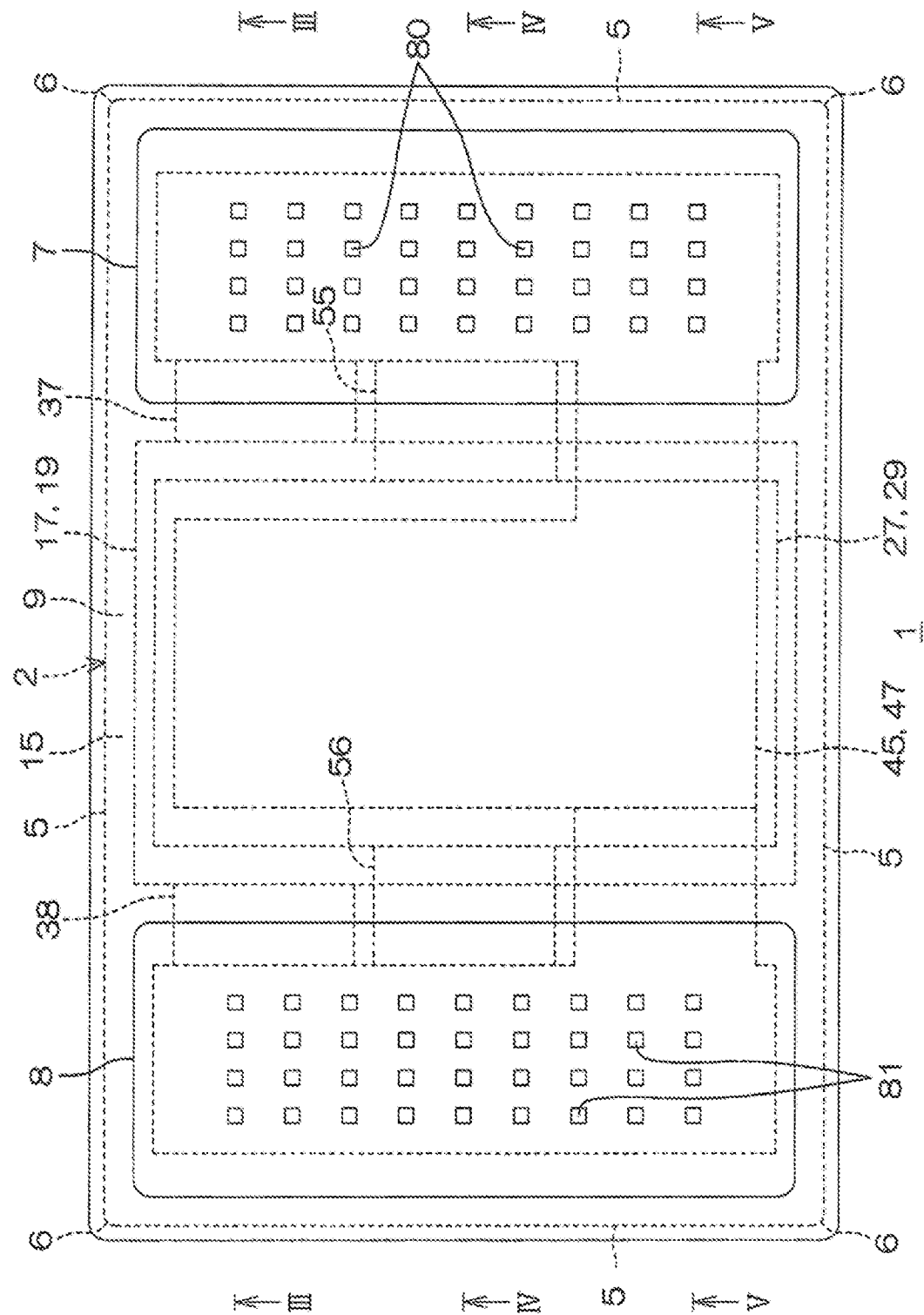
FIG. 2 is a schematic top view of the chip capacitor according to an embodiment of the present disclosure.
Figure 3:
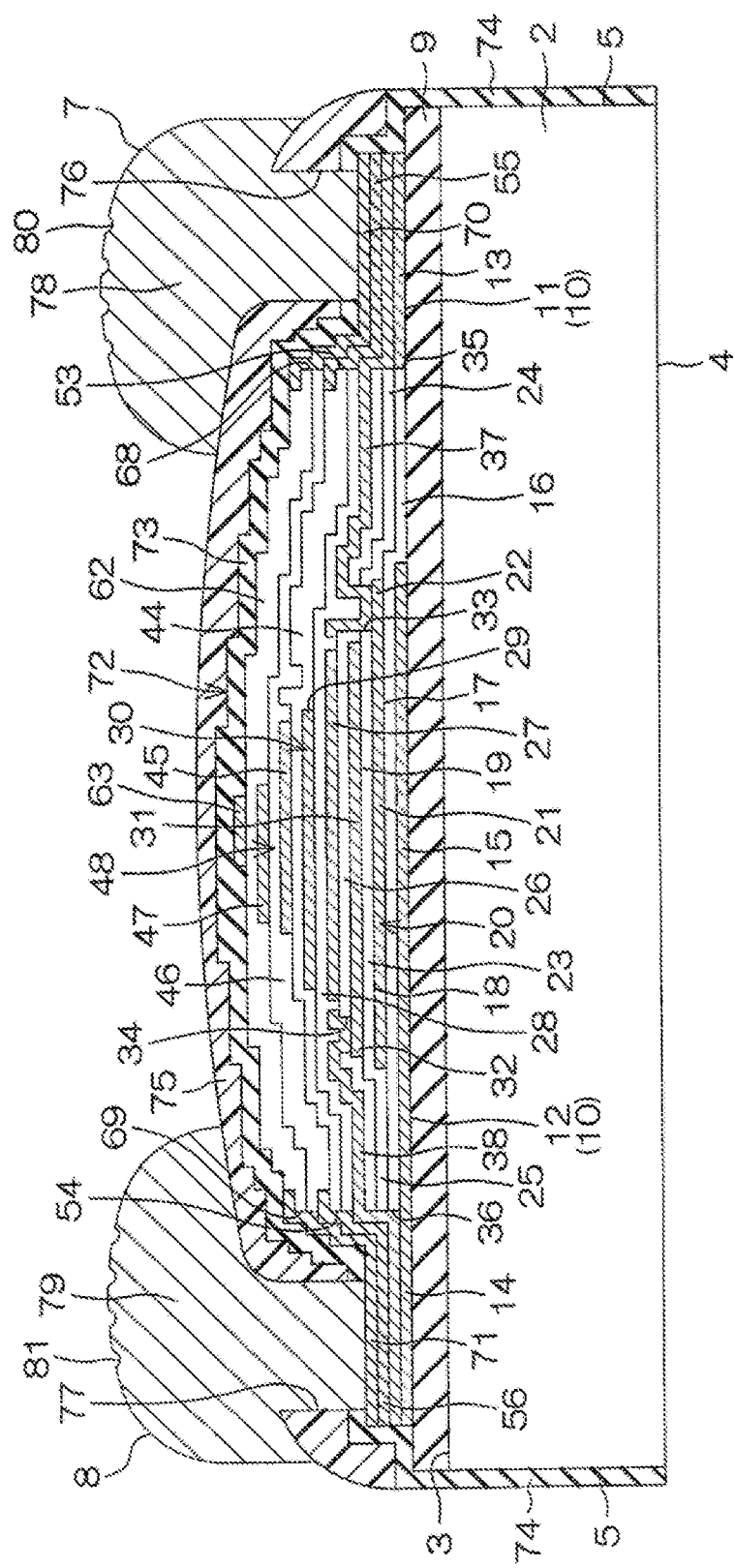
FIG. 3 is a cross-sectional view taken along line III-III of FIG. 2.
Figure 4:
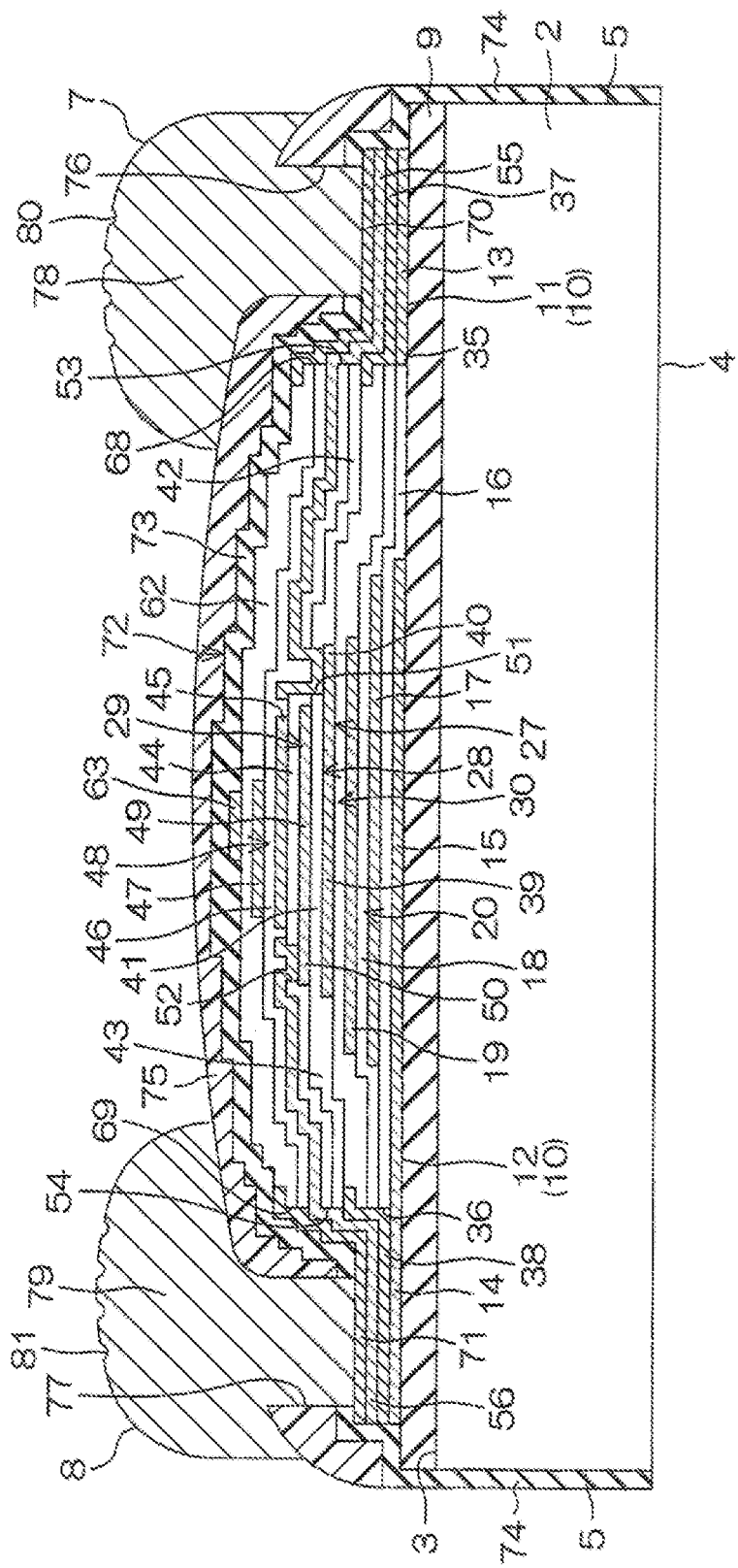
FIG. 4 is a cross-sectional view taken along line IV-IV of FIG. 2.
Figure 5:
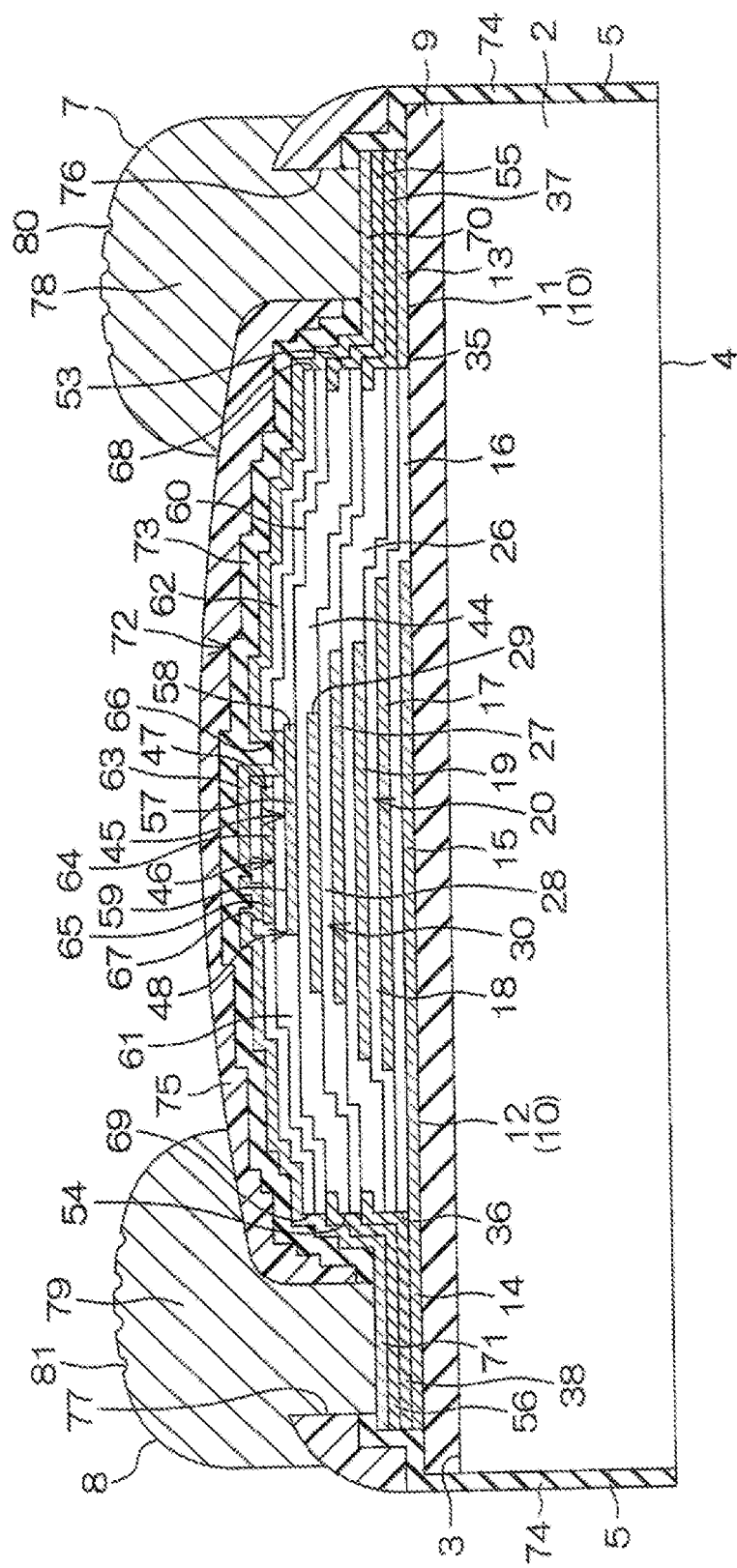
FIG. 5 is a cross-sectional view taken along line V-V of FIG. 2.

FIG. 1 is a schematic perspective view of a chip capacitor 1 according to an embodiment of the present disclosure. FIG. 2 is a schematic top view of the chip capacitor 1 according to an embodiment of the present disclosure. FIG. 3 is a cross-sectional view taken along line III-III of FIG. 2. FIG. 4 is a cross-sectional view taken along line IV-IV of FIG. 2. FIG. 5 is a cross-sectional view taken along line V-V of FIG. 2. Furthermore, for the sake of clarity and conciseness, reference numerals of constituent elements depicted in FIG. 3~FIG. 5 are sometimes omitted therefrom.

The chip capacitor 1 includes a substrate 2 which is a major constituent element of the chip capacitor 1 and is substantially in a cuboid shape. The substrate 2 is a silicon substrate.

The substrate 2 has a long side extending along a long-side direction, and the long side has a length L1 of 0.4 mm~2 mm, for example. The substrate 2 has a short side extending along a short-side direction, and the short side has a length L2 of 0.2 mm~2 mm, for example. In addition, the substrate 2 has a thickness T of 0.1 mm~0.5 mm, for example. Given the aforesaid dimensions of the substrate 2, the chip capacitor 1, a chip component thus configured, is applicable to various purposes.

The substrate 2 has a first side 3, a second side 4 opposite to the first side 3, and a third side 5 connecting the first side 3 and the second side 4. The first side 3 and the second side 4 of the substrate 2 enable the substrate 2 to be in a rectangular shape in plan view viewed from their normal directions (hereinafter referred to as "top-view").

The first side 3, the second side 4 and the third side 5 of the substrate 2 are also known as the front side, the rear side and the lateral side of the substrate 2, respectively. In this embodiment, since the substrate 2 is in a top-view rectangular shape, the third side 5 has four sides in total: a pair of sides disposed opposite to each other and facing the long-side direction of the substrate 2, and a pair of sides disposed opposite to each other and facing the short-side direction of the substrate 2. On the other hand, for example, in the cases of the substrate 2 has a top-view circular shape, top-view elliptical shape, or even top-view rectangular shape having each corners filleted/beveled (as shown in FIG. 2, having rounded corners 6), the third side 5 may not have dearly divided sides, which is different from FIG. 1.

A first external electrode 7 and a second external electrode 8 are disposed on the first side 3 of the substrate 2. The first external electrode 7 is disposed at one end of the long-side direction of the substrate 2. The second external electrode 8 is disposed at the other end of the long-side direction of the substrate 2. Each of the first external electrode 7 and the second external electrode 8 has the shape of a top-view rectangle which has a pair of long sides extending along the short sides of the substrate 2.

As shown in FIG. 1 and FIG. 3 FIG. 5, an insulating layer 9 is disposed on the first side 3 of the substrate 2 to cover the whole area of the first side 3 of the substrate 2. The insulating layer 9 is, for example, $SiO_2$ film or SiN film. The insulating layer 9 has a thickness of 20000 Å~40000 Å, for example.

A first conductive layer 10 is disposed on the insulating layer 9. The first conductive layer 10, for example, includes Cu-containing or Al-containing conductive material, such as Cu, Al, AlSi or AlCu. The first conductive layer 10 has a thickness of 3000 Å~40000 Å, for example.

The first conductive layer 10 includes a first portion 11 and a second portion 12 which are separated from each other.

The first portion 11 of the first conductive layer 10 includes a first pad 13 disposed at one end of the long-side direction of the substrate 2. In the embodiment, the first portion 11 of the first conductive layer 10 includes the first pad 13, and may further include a conductive portion integrally extended from the first pad 13. For example, the first portion 11 of the first conductive layer 10 includes a conductive portion extending from the first pad 13 toward the other end of the long-side direction of the substrate 2.

The second portion 12 of the first conductive layer 10 integrally includes: a second pad 14 disposed at the other end of the long-side direction of the substrate 2; and a capacitor region 15 extending from the second pad 14 toward one end of the long-side direction of the substrate 2.

A first insulating layer 16 is disposed on the first side 3 of the substrate 2 to cover the first conductive layer 10. The first insulating layer 16 is, for example, $SiO_2$ film or SiN film. The first insulating layer 16 has a thickness of, for example, 5000 Å~20000 Å.

In the capacitor region 15 of the first conductive layer 10, a first capacitor unit 20 is disposed on the first insulating layer 16. The first capacitor unit 20 includes a first lower electrode 17, a first dielectric layer 18 covering the first lower electrode 17, and a first upper electrode 19 formed on the first dielectric layer 18. The first capacitor unit 20 has a configuration of the first lower electrode 17 and first upper electrode 19 having the first dielectric layer 18 interposed between in a vertical direction.

The first lower electrode 17 and first upper electrode 19, for example, include Cu-containing or Al-containing conductive material, such as Cu, Al, AlSi or AlCu. The first lower electrode 17 and first upper electrode 19 have a thickness of 3,000 Å~40,000 Å, for example. The first dielectric layer 18 is, for example, $SiO_2$ film or SiN film. The first dielectric layer 18 has a thickness of, for example, 5,000 Å~20,000 Å.

As shown in FIG. 3, the first lower electrode 17 integrally includes: a first capacitor region 21 facing the first upper electrode 19 in a third direction perpendicular to the first side 3 of the substrate 2; and a first connection region 22 extending from the first capacitor region 21 toward a first direction parallel to the first side 3 of the substrate 2 (toward one end of the long-side direction of the substrate 2) but not facing the first upper electrode 19 in the third direction perpendicular to the first side 3 of the substrate 2.

The first dielectric layer 18 integrally includes: a third capacitor region 23 disposed between the first lower electrode 17 and the first upper electrode 19; and a first extension portion 24 and a second extension portion 25, respectively extending from the third capacitor region 23 along a first direction parallel to the first side 3 of the substrate 2 (toward one end of the long-side direction of the substrate 2) toward the first pad 13 and along a second direction parallel to the first side 3 of the substrate 2 (toward the other end of the long-side direction of the substrate 2) toward the second pad 14.

In the chip capacitor 1, a second insulating layer 26 is disposed on the first capacitor unit 20 to cover the first upper electrode 19. The second insulating layer 26 is, for example, $SiO_2$ film or SiN film. The second insulating layer 26 has a thickness of, for example, 5,000 Å~20,000 Å.

A second capacitor unit 30 is disposed on the second insulating layer 26. The second capacitor unit 30 includes a second lower electrode 27, a second dielectric layer 28 covering the second lower electrode 27, and a second upper electrode 29 formed on the second dielectric layer 28. The second capacitor unit 30 has a configuration of the second lower electrode 27 and second upper electrode 29 having the second dielectric layer 28 interposed between.

The second lower electrode 27 and second upper electrode 29 for example, includes Cu-containing or Al-containing conductive material, such as Cu, Al, AlSi or AlCu. The second lower electrode 27 and second upper electrode 29 have a thickness of, for example, 3,000 Å~40,000 Å.

The second dielectric layer 28 is, for example, $SiO_2$ film or SiN film. The second dielectric layer 28 has a thickness of, for example, 5,000 Å~20,000 Å.

Herein the first upper electrode 19 integrally includes: a second capacitor region 31 facing the second lower electrode 27; and a second connection region 32 extending from the second capacitor region 31 toward a second direction opposite to the first direction (toward the other end of the long-side direction of the substrate 2) but not facing the second lower electrode 27 in the third direction perpendicular to the first side 3 of the substrate 2. Therefore, the first capacitor region 21 of the first lower electrode 17 has an area greater than the second capacitor region 31 of the first upper electrode 19 according to the extent of the extension of the second connection region 32.

As shown in FIG. 3, a first contact via 33 is formed on the first connection region 22. The first contact via 33 penetrates the second insulating layer 26 and first dielectric layer 18 so as for the first lower electrode 17 to be exposed.

A second contact via 34 on formed in the second connection region 32. The second contact via 34 penetrates the second insulating layer 26 so as for the first upper electrode 19 to be exposed.

As shown in FIG. 3, a third contact via 35 is formed on the first pad 13. The third contact via 35 penetrates the second insulating layer 26, first dielectric layer 18 and first insulating layer 16 so as for the first pad 13 to be exposed. A fourth contact via 36 is formed on the second pad 14. The fourth contact via 36 penetrates the second insulating layer 26, first dielectric layer 18 and first insulating layer 16 so as for the second pad 14 to be exposed.

A first wiring portion 37 is disposed on the second insulating layer 26 and extending from the first contact via 33 to the third contact via 35. A second wiring portion 38 is disposed on the second insulating layer 26 and extending from the second contact via 34 to the fourth contact via 36.

As shown in FIG. 2, in a region on one side of the short-side direction of the substrate 2, the wiring portions 37, 38 respectively extend from the capacitor region 15 in two opposite directions. The wiring portions 37, 38 and a second lower electrode 27 disposed on the second insulating layer 26 shared by the wiring portions 37, 38 are collectively referred to as "the second conductive layer on the second insulating layer 26."

Therefore, like the second lower electrode 27, the wiring portions 37, 38, for example, include Cu-containing or Al-containing conductive material, such as Cu, Al, AlSi or AlCu. The wiring portions 37, 38 has a thickness of, for example, 3,000 Å~40,000 Å. In this embodiment, the first wiring portion 37 and second wiring portion 38 are formed in such a manner as to be separated from the second lower electrode 27.

The first wiring portion 37 is connected to the first lower electrode 17 through the first contact via 33 and connected to the first pad 13 through the third contact via 35. The second wiring portion 38 is connected to the first upper electrode 19 through the second contact via 34 and connected to the second pad 14 through the fourth contact via 36.

As shown in FIG. 4, the second lower electrode 27 integrally includes: a fourth capacitor region 39 facing the second upper electrode 29 in the third direction perpendicular to the first side 3 of the substrate 2; and a fourth connection region 40 extended from the fourth capacitor region 39 toward a first direction parallel to the first side 3 of the substrate 2 (toward one end of the long-side direction of the substrate 2) but not facing the second upper electrode 29 in the third direction perpendicular to the first side 3 of the substrate 2.

The second dielectric layer 28 integrally includes: a fifth capacitor region 41 disposed between the second lower electrode 27 and the second upper electrode 29; and a third extension portion 42 and a fourth extension portion 43, respectively extending from the fifth capacitor region 41 respectively along a first direction parallel to the first side 3 of the substrate 2 (toward one end of the long-side direction of the substrate 2) toward the first pad 13, and extending from the fifth capacitor region 41 along a second direction parallel to the first side 3 of the substrate 2 (toward the other end of the long-side direction of the substrate 2) toward the second pad 14.

In the chip capacitor 1, a third insulating layer 44 is disposed on the second capacitor unit 30 to cover the second upper electrode 29. The third insulating layer 44 is, for example, $SiO_2$ film or SiN film. The third insulating layer 44 has a thickness of, for example, 5,000 Å~20,000 Å.

A third capacitor unit 48 is disposed on the third insulating layer 44. The third capacitor unit 48 includes a third lower electrode 45, a third dielectric layer 46 covering the third lower electrode 45, and a third upper electrode 47 formed on third dielectric layer 46. The third capacitor unit 48 has a configuration of the third lower electrode 45 and third upper electrode 47 having the third dielectric layer 46 interposed between in a vertical direction.

The third lower electrode 45 and third upper electrode 47, for example, include Cu-containing or Al-containing conductive material, such as Cu, Al, AlSi or AlCu. The third lower electrode 45 and third upper electrode 47 have a thickness of, for example, 3,000 Å~40,000 Å, for example.

The third dielectric layer 46 is, for example, $SiO_2$ film or SiN film. The third dielectric layer 46 has a thickness of, for example, 5,000 Å~20,000 Å.

The second upper electrode 29 integrally includes: a third capacitor region 49 facing the third lower electrode 45; and a sixth connection region 50 extending from the sixth capacitor region 49 toward a second direction opposite to the first direction (toward the other end of the long-side direction of the substrate 2) but not facing the third lower electrode 45 in the third direction perpendicular to the first side 3 of the substrate 2. Therefore, the fourth capacitor region 39 of the second lower electrode 27 has an area greater than the sixth capacitor region 49 of the second upper electrode 29 according to the extent of the extension of the sixth connection region 50.

As shown in FIG. 4, a fifth contact via 51 is formed in the fourth connection region 40. The fifth contact via 51 penetrates the third insulating layer 44 and second dielectric layer 28 so as for the second lower electrode 27 to be exposed. A sixth contact via 52 is formed in the sixth connection region 50. The sixth contact via 52 penetrates the third insulating layer 44 so as for the second upper electrode 29 to be exposed.

Furthermore, as shown in FIG. 4, a seventh contact via 53 is formed on the first pad 13. The seventh contact via 53 penetrates the third insulating layer 44 and second dielectric layer 28 so as to be connected with the third contact via 35. An eighth contact via 54 is formed on the second pad 14. The eighth contact via 54 penetrates the third insulating layer 44 and second dielectric layer 28 so as to be connected with the fourth contact via 36.

A third wiring portion 55 is disposed on the third insulating layer 44 and extending from the fifth contact via 51 to the seventh contact via 53. A fourth wiring portion 56 is disposed on the third insulating layer 44 and extending from the sixth contact via 52 to the eighth contact via 54.

As shown in FIG. 2, in the central region of the short-side direction of the substrate 2, the wiring portions 55, 56 extend from the capacitor region 15 toward two opposite directions, respectively. The wiring portions 55, 56 and the third lower electrode 45 on the third insulating layer 44 shared by the wiring portions 55, 56 are collectively referred to as "the third conductive layer on the third insulating layer 44."

Therefore, like the second lower electrode 27, the wiring portions 55, 56, for example, include Cu-containing or Al-containing conductive material, such as Cu, Al, AlSi or AlCu. The wiring portions 55, 56 have a thickness of, for example, 3,000 Å~40,000 Å. In this embodiment, the third wiring portion 55 and fourth wiring portion 56 are formed in such a manner as to be separated from the third lower electrode 45.

The third wiring portion 55 is connected to the second lower electrode 27 through the fifth contact via 51 and connected to the first wiring portion 37 through the seventh contact via 53. By such configuration, the third wiring portion 55 is electrically connected to the first pad 13 through the first wiring portion 37.

The fourth wiring portion 56 is connected to the second upper electrode 29 through the sixth contact via 52 and connected to the second wiring portion 38 through the eighth contact via 54. Therefore, the fourth wiring portion 56 is electrically connected to the second pad 14 through the second wiring portion 38.

As shown in FIG. 2, the third wiring portion 55 and fourth wiring portion 56 are respectively configured not to overlap with the first wiring portion 37 and second wiring portion 38 when viewed in the third direction perpendicular to the first side 3 of the substrate 2. Therefore, the first wiring portion 37 and second wiring portion 38 do not overlap the third wiring portion 55 and fourth wiring portion 56 in the lamination direction of a lamination structure of the insulating layers and the conductive layers on the substrate 2, thereby minimizing the thickness of the lamination structure. Furthermore, as shown in FIG. 3~FIG. 5, the first wiring portion 37, second wiring portion 38, third wiring portion 55 and fourth wiring portion 56 are respectively formed in a region over the first pad 13 and a region over the second pad 14, and each of them has a widthwise dimension from one end to the other end of the short-side direction of the substrate 2.

As shown in FIG. 5, the third lower electrode 45 integrally includes: a seventh capacitor region 57 facing the third upper electrode 47 in the third direction perpendicular to the first side 3 of the substrate 2; and a seventh connection region 58 extended from the seventh capacitor region 57 toward a first direction parallel to the first side 3 of the substrate 2 (toward one end of the long-side direction of the substrate 2) but not facing the third upper electrode 47 in the third direction perpendicular to the first side 3 of the substrate 2.

The third dielectric layer 46 integrally includes: an eighth capacitor region 59 disposed between the third lower electrode 45 and the third upper electrode 47; and a fifth extension portion 60 and a sixth extension portion 61, respectively extending from the eighth capacitor region 59 along a first direction parallel to the first side 3 of the substrate 2 (toward one end of the long-side direction of the substrate 2) toward the first pad 13, and from the eighth capacitor region 59 toward a second direction parallel to the first side 3 of the substrate 2 (toward the other end of the long-side direction of the substrate 2) toward the second pad 14.

In the chip capacitor 1, a fourth insulating layer 62 is disposed on the third capacitor unit 48 to cover the third upper electrode 47. The fourth insulating layer 62 is, for example, $SiO_2$ film or SiN film. The fourth insulating layer 62 has a thickness of, for example, 5,000 Å~20,000 Å.

An uppermost conductive layer 63 is disposed on the fourth insulating layer 62. The uppermost conductive layer 63, for example, includes Cu-containing or Al-containing conductive material, such as Cu, Al, AlSi or AlCu. The uppermost conductive layer 63 has a thickness of, for example, 3,000 Å~40,000 Å.

The third upper electrode 47 integrally includes: a ninth capacitor region 64 facing the uppermost conductive layer 63; and a ninth connection region 65 extended from the ninth capacitor region 64 toward a second direction opposite to the first direction (toward the other end of the long-side direction of the substrate 2) but not facing the uppermost conductive layer 63 in the third direction perpendicular to the first side 3 of the substrate 2. Therefore, the seventh capacitor region 57 of the third lower electrode 45 has an area greater than the ninth capacitor region 64 of the third upper electrode 47 according to the extent of the extension of the ninth connection region 65.

As shown in FIG. 5, a ninth contact via 66 is formed in the seventh connection region 58. The ninth contact via 66 penetrates the fourth insulating layer 62 and third dielectric layer 46 so as for the third lower electrode 45 to be exposed. A tenth contact via 67 is formed in the ninth connection region 65. The tenth contact via 67 penetrates the fourth insulating layer 62 so as for the third upper electrode 47 to be exposed.

As shown in FIG. 5, an eleventh contact via 68 is formed on the first pad 13. The eleventh contact via 68 penetrates the fourth insulating layer 62 and third dielectric layer 46 so as to be connected with the third contact via 35 and seventh contact via 53. A twelfth contact via 69 is formed on the second pad 14. The twelfth contact via 69 penetrates the fourth insulating layer 62 and third dielectric layer 46 so as to be connected with the fourth contact via 36 and the eighth contact via 54.

A fifth wiring portion 70 is disposed on the fourth insulating layer 62 and extended from the ninth contact via 66 to the eleventh contact via 68. A sixth wiring portion 71 is disposed on the fourth insulating layer 62 and extended from the tenth contact via 67 to the twelfth contact via 69.

As shown in FIG. 2, in a region on the other side of the short-side direction of the substrate 2, the wiring portions 70, 71 respectively extend from the capacitor region 15 toward two opposite directions. Alternatively, the wiring portions 70, 71 are configured to be portions constituting the uppermost conductive layer 63 dispose on the fourth insulating layer 62 shared by the wiring portions 70, 71.

Therefore, like the uppermost conductive layer 63, the wiring portions 70, 71, for example, include Cu-containing or Al-containing conductive material, such as Cu, Al, AlSi or AlCu. The wiring portions 70, 71 have a thickness of, for example, 3,000 Å~40,000 Å. In this embodiment, the fifth wiring portion 70 and the uppermost conductive layer 63 are integrally connected.

The fifth wiring portion 70 is connected to the third lower electrode 45 through the ninth contact via 66 and connected to the third wiring portion 55 through the eleventh contact via 68. By this configuration, the fifth wiring portion 70 is electrically connected to the first pad 13 through the first wiring portion 37 and third wiring portion 55.

The sixth wiring portion 71 is connected to the third upper electrode 47 through the tenth contact via 67 and connected to the fourth wiring portion 56 through the twelfth contact via 69. By this configuration, the sixth wiring portion 71 is electrically connected to the second pad 14 through the second wiring portion 38 and fourth wiring portion 56.

As shown in FIG. 2, the fifth wiring portion 70 and sixth wiring portion 71 are configured to prevent the first wiring portion 37 and second wiring portion 38 from respectively overlapping the third wiring portion 55 and fourth wiring portion 56 when viewed in the third direction perpendicular to the first side 3 of the substrate 2. Therefore, the first wiring portion 37 and the second wiring portion 38, as well as the third wiring portion 55 and the fourth wiring portion 56 do not overlap the fifth wiring portion 70 and sixth wiring portion 71 in the lamination direction of a lamination structure of the insulating layers and the conductive layers on the substrate 2, thereby minimizing the thickness of the lamination structure. Furthermore, as shown in FIG. 3~FIG. 5, the fifth wiring portion 70 and the sixth wiring portion 71 are respectively formed in a region above the first pad 13 and a region above the second pad 14, and each of them has a widthwise dimension from one end to the other end of the short-side direction of the substrate 2.

A surface insulating film 72 is disposed on the substrate 2 to cover the first capacitor unit 20, the second capacitor unit 30 and the third capacitor unit 48. The surface insulating film 72 is, for example, $SiO_2$ film or SiN film. The surface insulating film 72 has a thickness of, for example, 10,000 Å~15,000 Å.

The surface insulating film 72 integrally includes a first portion 73 covering a portion of the first side 3 of the substrate 2 and a second portion 74 covering the third side 5 of the substrate 2. Therefore, the second side 4 of the substrate 2 is the exposed side, and the other sides are entirely covered by the surface insulating film 72.

A surface protective film 75 is disposed on the first portion 73 of the surface insulating film 72. The surface protective film 75 is, for example, resin film, such as polyimide film. The surface protective film 75 has a thickness of, for example, 20,000 Å~100,000 Å.

The surface protective film 75 is formed to be expanding upward (in the direction away from the first side 3 of the substrate 2) from the middle of the long-side direction of the substrate 2 and between the first external electrode 7 and the second external electrode 8.

A first pad opening 76 is formed in the surface insulating film 72 and the surface protective film 75 at a position corresponding to the first pad 13. Therefore, the fifth wiring portion 70 is exposed from the first pad opening 76.

A second pad opening 77 is formed in the surface insulating film 72 and the surface protective film 75 at a position corresponding to the second pad 14. Therefore, the sixth wiring portion 71 is exposed from the second pad opening 77.

The first external electrode 7 is disposed in the first pad opening 76 and is therein electrically connected to the first pad 13. Therefore, the first external electrode 7 is collectively electrically connected to the third lower electrode 45, second lower electrode 27 and first lower electrode 17 through the fifth wiring portion 70, third wiring portion 55 and first wiring portion 37, respectively, The second external electrode 8 is disposed in the second pad opening 77 and is therein electrically connected to the second pad 14. Therefore, the second external electrode 8 is collectively electrically connected to the third upper electrode 47, second upper electrode 29 and first upper electrode 19 through the sixth wiring portion 71, fourth wiring portion 56 and second wiring portion 38, respectively, Each of the first external electrode 7 and the second external electrode 8 includes a first protruding portion 78 and a second protruding portion 79 protruding from a surface of the surface protective film 75.

When viewed in the third direction perpendicular to the first side 3 of the substrate 2, the first protruding portion 78 is configured to cover a lamination structure of the first insulating layer 16, first dielectric layer 18, second insulating layer 26, first wiring portion 37, second dielectric layer 28, third insulating layer 44, third wiring portion 55, fourth insulating layer 62 and fifth wiring portion 70 and extend from above the first pad 13, respectively, to an inner region of the substrate 2 (toward the other side of the long-side direction of the substrate 2).

The first external electrode 7 has an upper surface including a plurality of dents 80 recessing toward the first side 3 of the substrate 2. As shown in FIG. 1 and FIG. 2, the dents 80 are, for example, arranged in a matrix along the long-side direction and the short-side direction of the substrate 2. The dents 80 are, for example, formed by a process as follows: processing the uppermost conductive layer (i.e., the fifth wiring portion 70 in this embodiment) on the first pad 13 to groove and ridge the uppermost conductive layer and growing the first external electrode 7 from the processed surface by plating.

When viewed in the third direction perpendicular to the first side 3 of the substrate 2, the second protruding portion 79 is configured to cover a lamination structure of the first insulating layer 16, first dielectric layer 18, second insulating layer 26, second wiring portion 38, second dielectric layer 28, third insulating layer 44, fourth wiring portion 56, fourth insulating layer 62 and sixth wiring portion 71 and extend from a region above the second pad 14 toward an inner region of the substrate 2 (toward one end of the long-side direction of the substrate 2).

The second external electrode 8 has an upper surface including a plurality of dents 81 recessing toward the first side 3 of the substrate 2. The dents 81 are, for example, as shown in FIG. 1 and FIG. 2, arranged in a matrix along the long-side direction and short-side direction of the substrate 2. The dents 81 are, for example, formed by a process as follows: processing the uppermost conductive layer (i.e., the sixth wiring portion 71 in this embodiment) on the second pad 14 to groove and ridge the uppermost conductive layer and growing the second external electrode 8 from the processed surface by plating.

The first external electrode 7 and the second external electrode 8 are, for example, Ni/Pd/Au laminated films (including Ni film, Pd film and Au film) laminated successively from one side of the substrate 2. Alternatively, the laminated films are respective plating layers formed by plating growth.

Figure 6A:
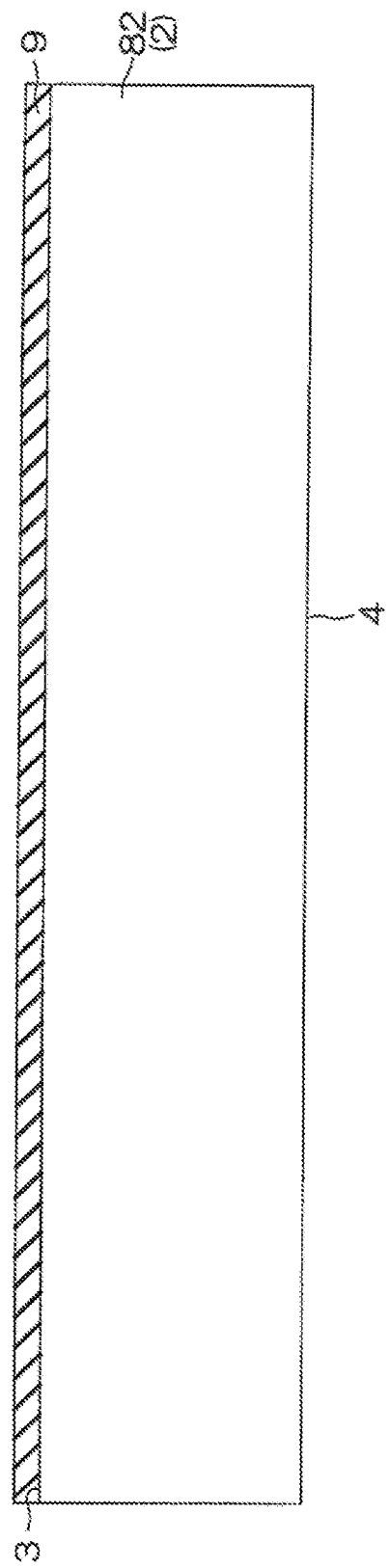
FIG. 6A shows a portion of the manufacturing process of the chip capacitor.
Figure 6B:
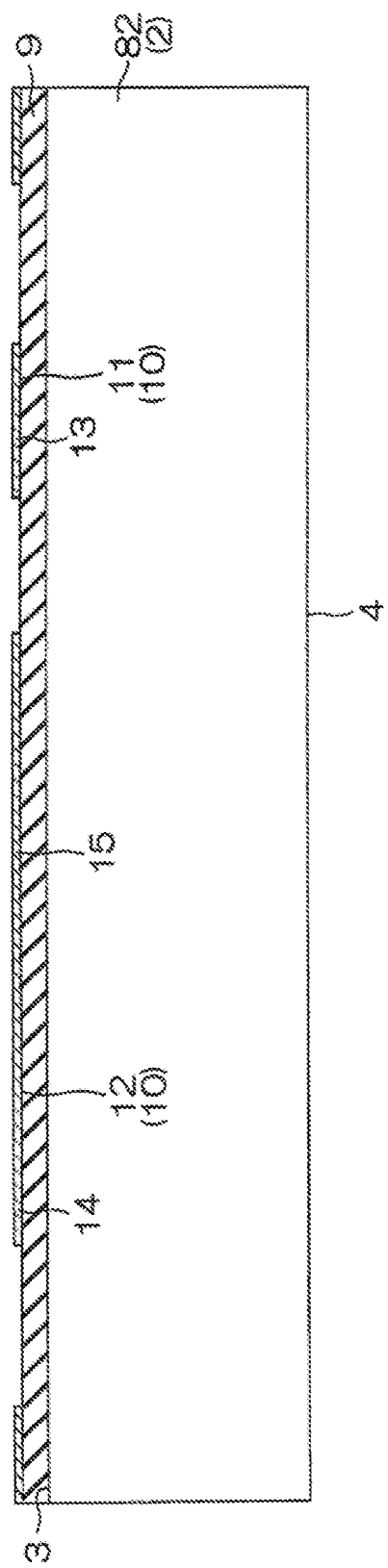
FIG. 6B shows the next step of FIG. 6A.
Figure 6C:
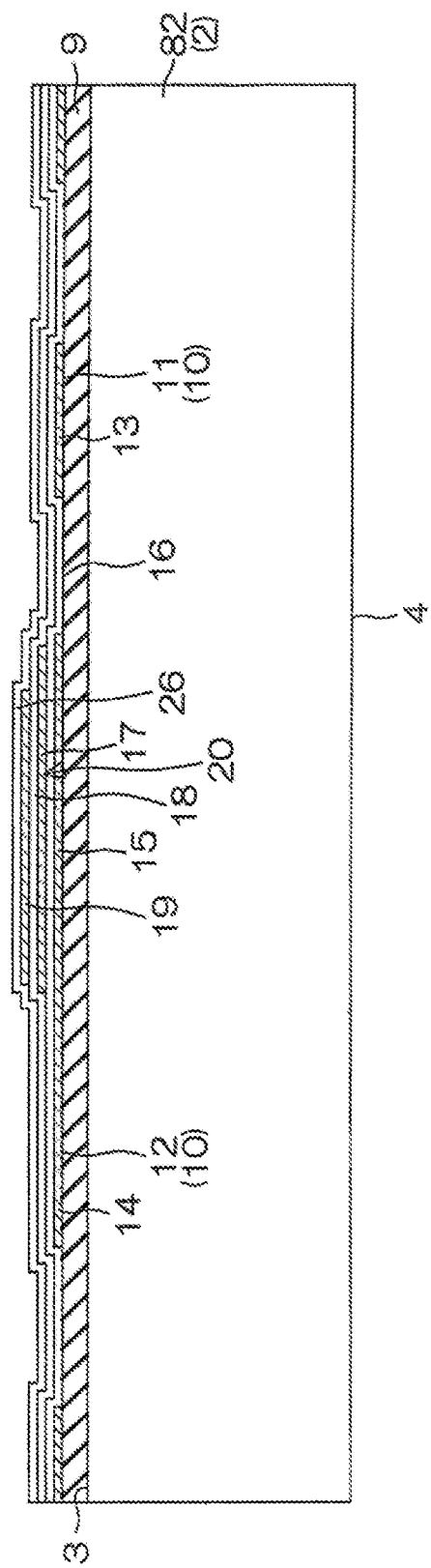
FIG. 6C shows the next step of FIG. 6B.
Figure 6D:
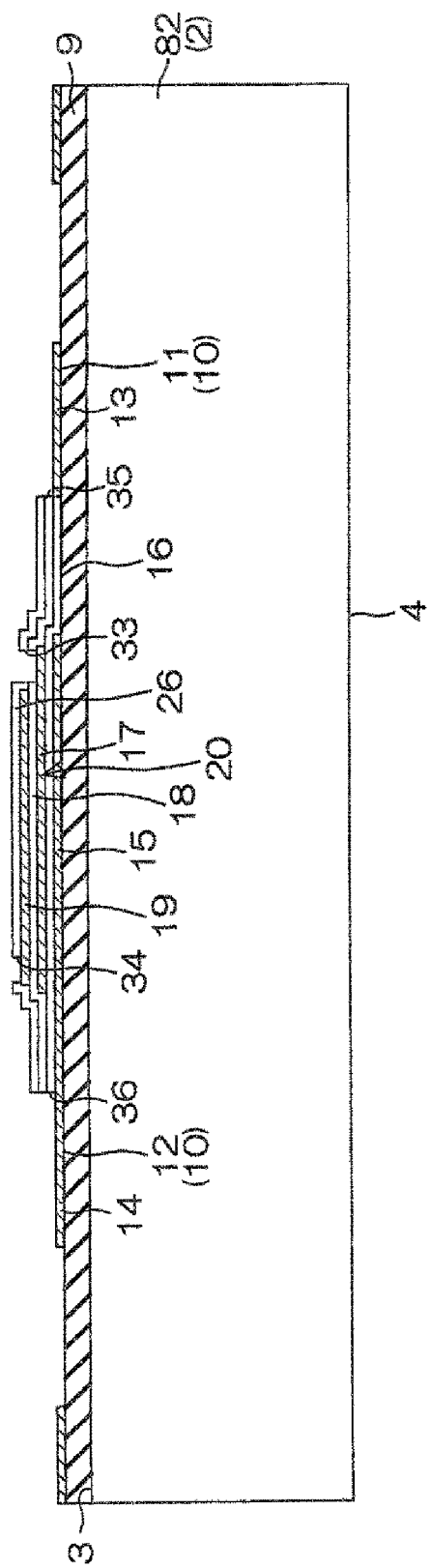
FIG. 6D shows the next step of FIG. 6C.
Figure 6E:
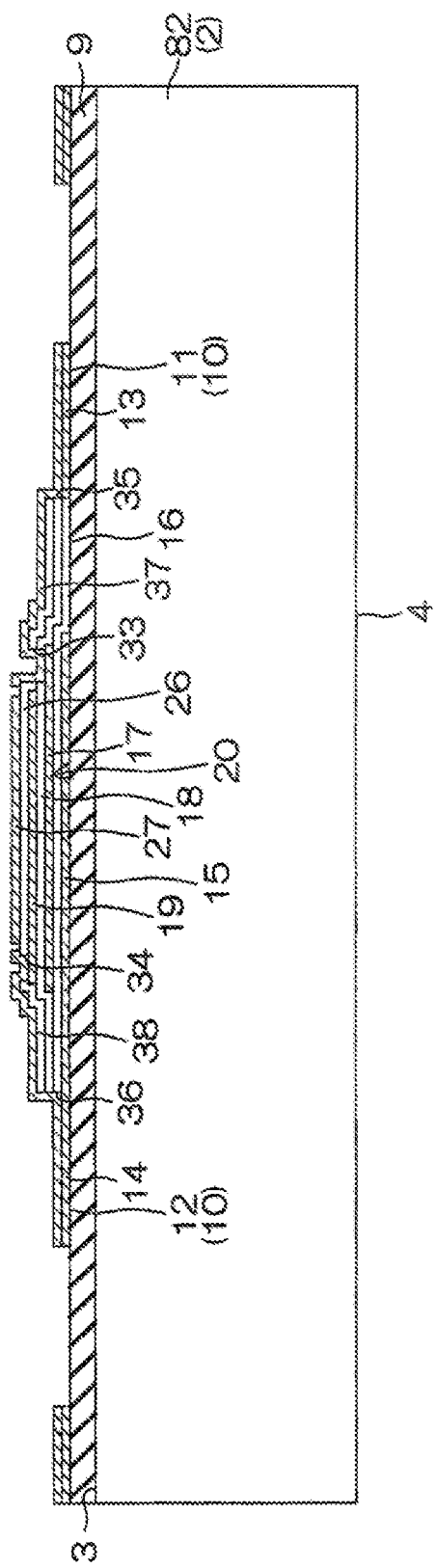
FIG. 6E shows the next step of FIG. 6D.
Figure 6F:
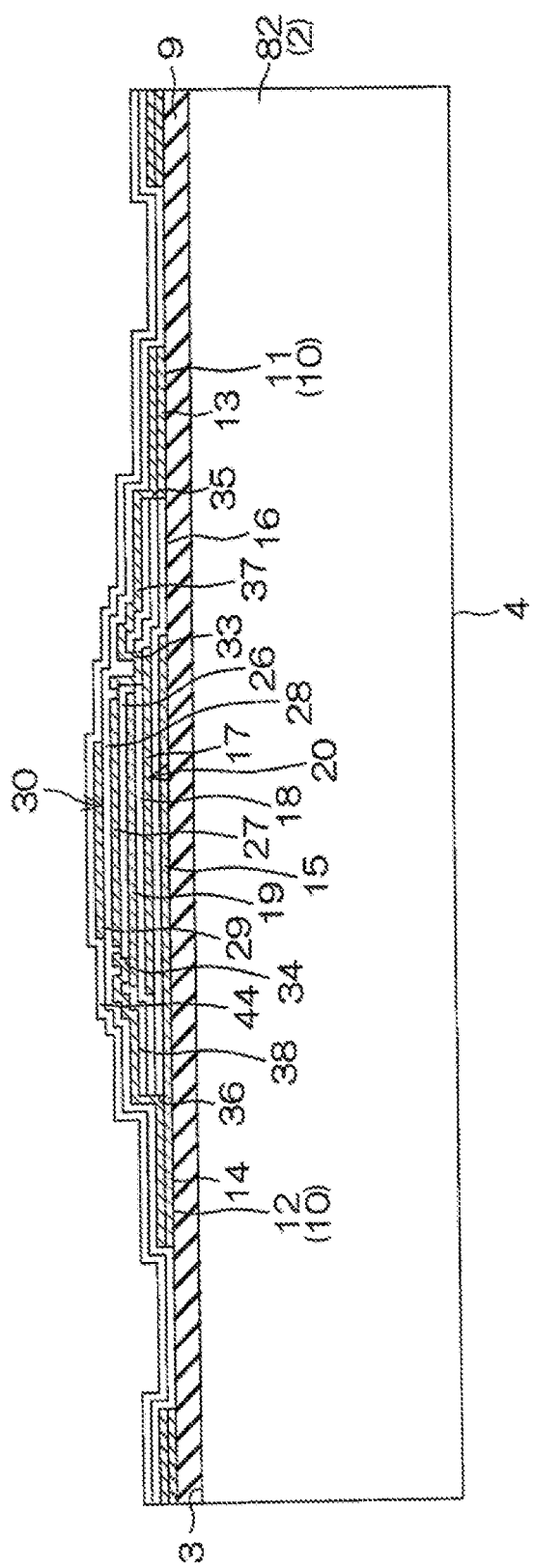
FIG. 6F shows the next step of FIG. 6E.
Figure 6G:
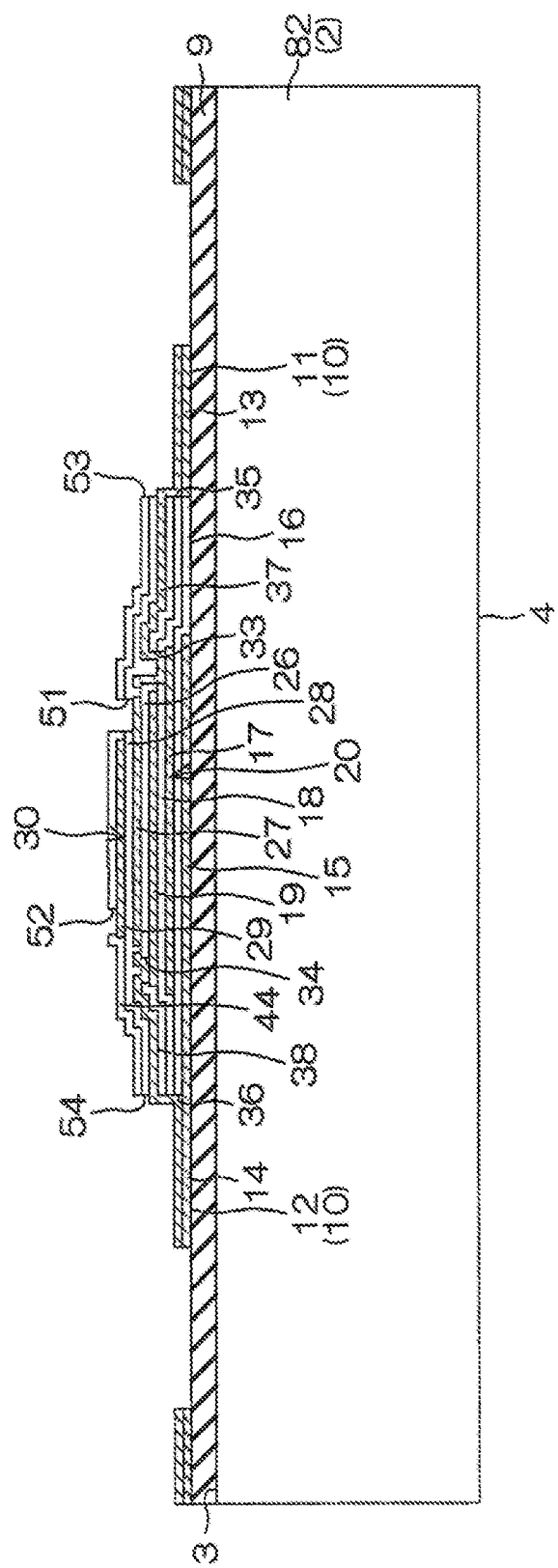
FIG. 6G shows the next step of FIG. 6F.
Figure 6H:
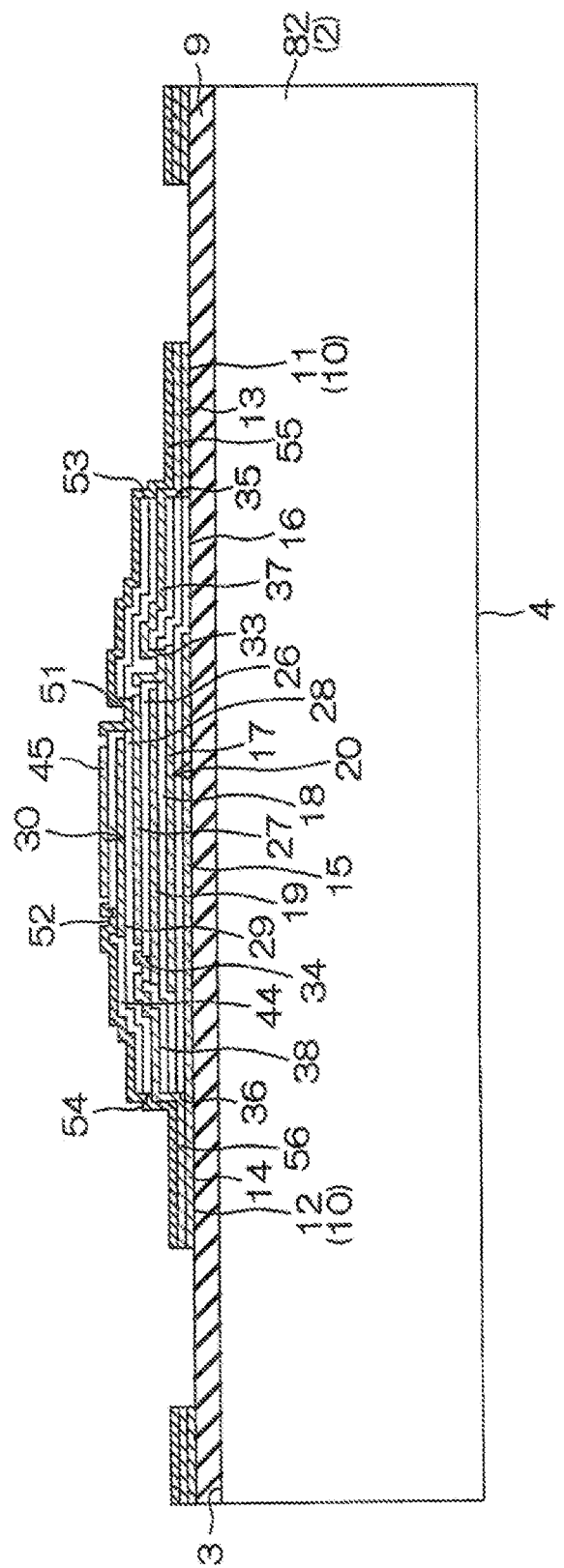
FIG. 6H shows the next step of FIG. 6G.
Figure 6I:
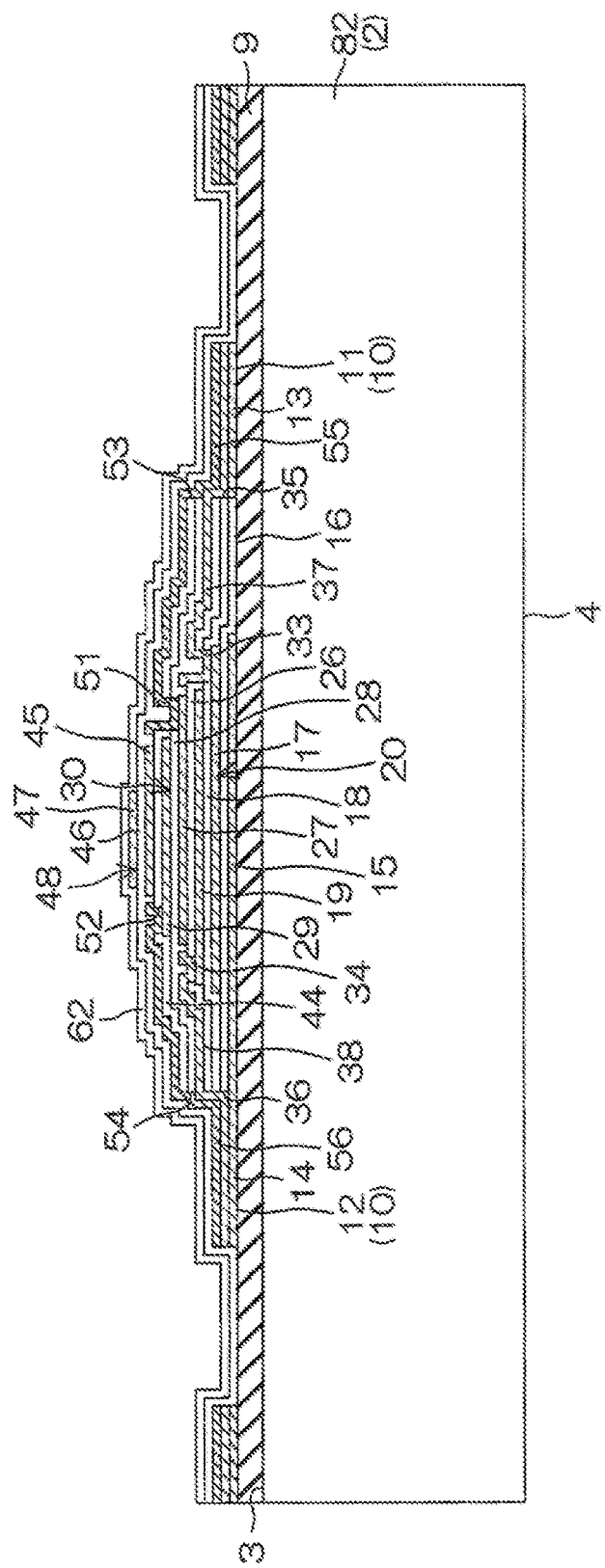
FIG. 6I shows the next step of FIG. 6H.
Figure 6J:
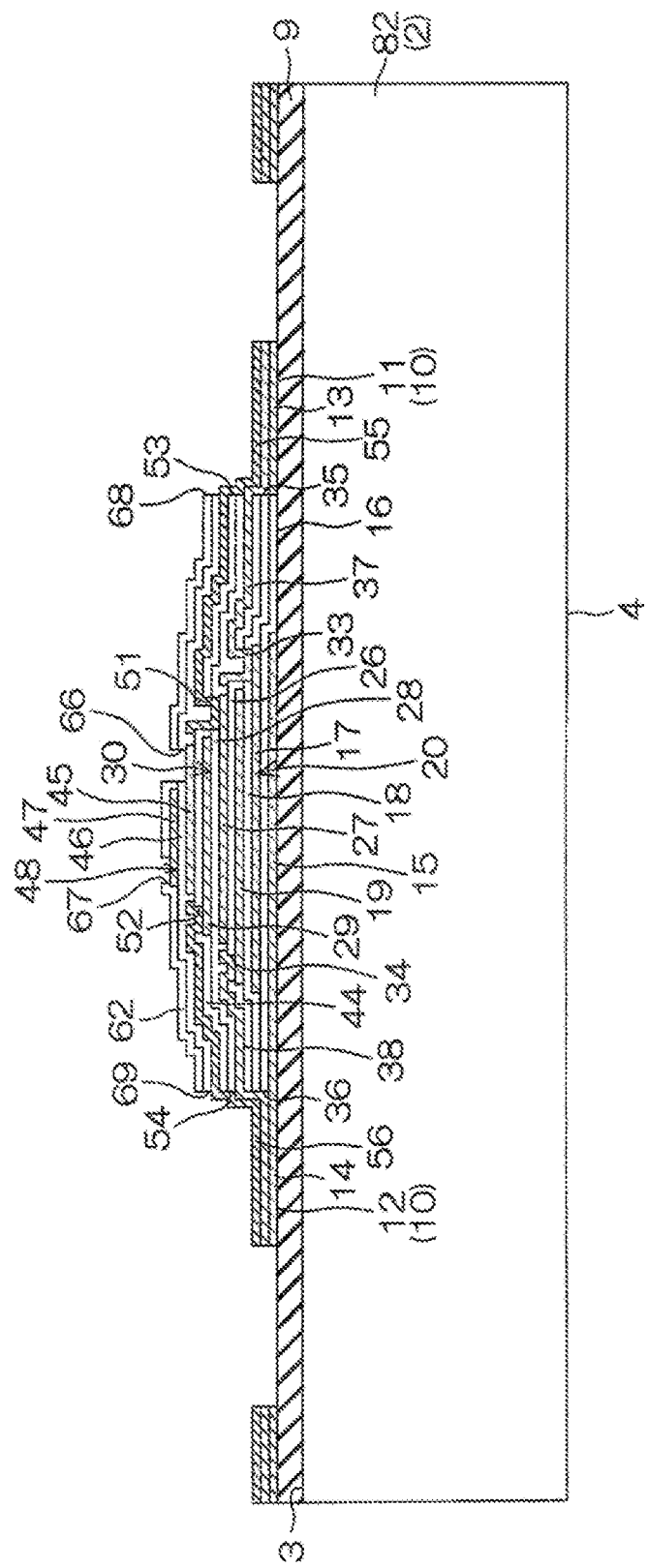
FIG. 6J shows the next step of FIG. 6I.
Figure 6K:
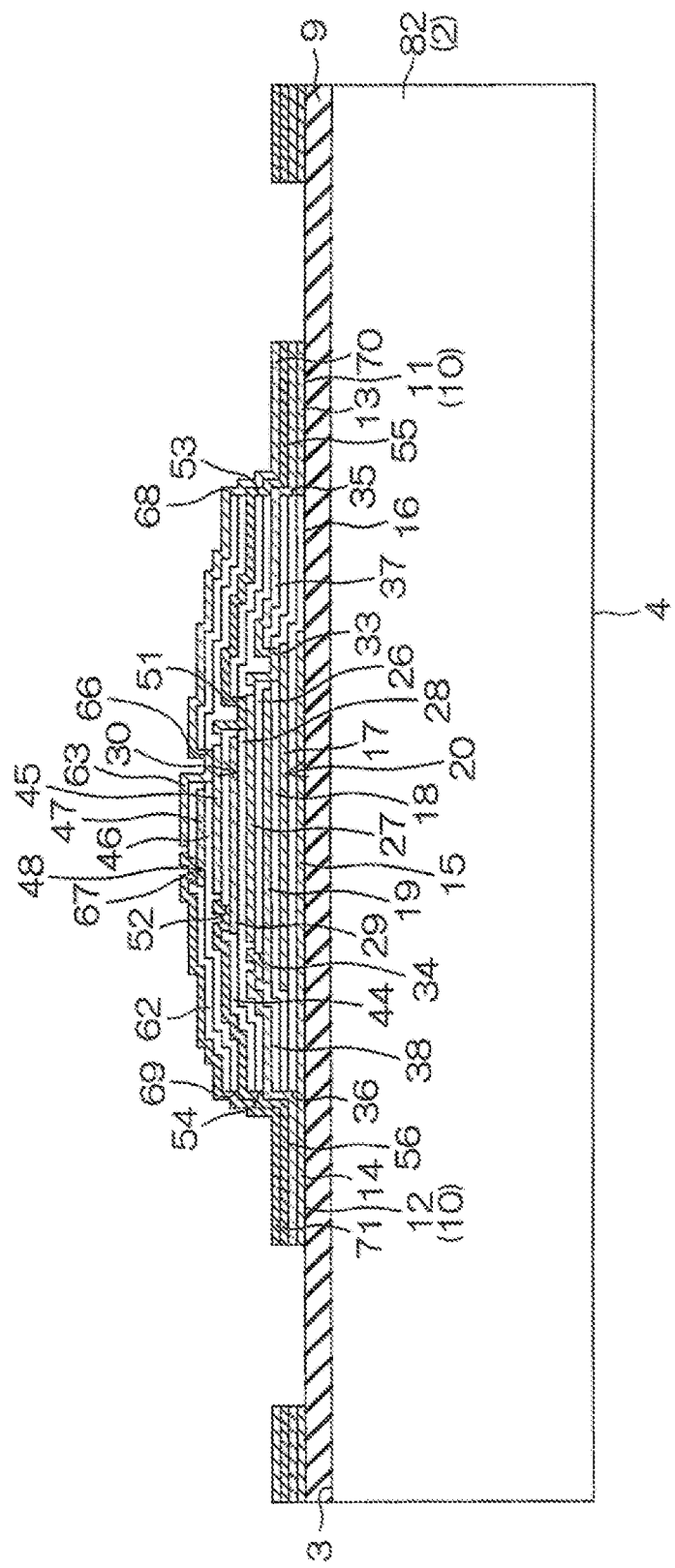
FIG. 6K shows the next step of FIG. 6J.
Figure 6L:
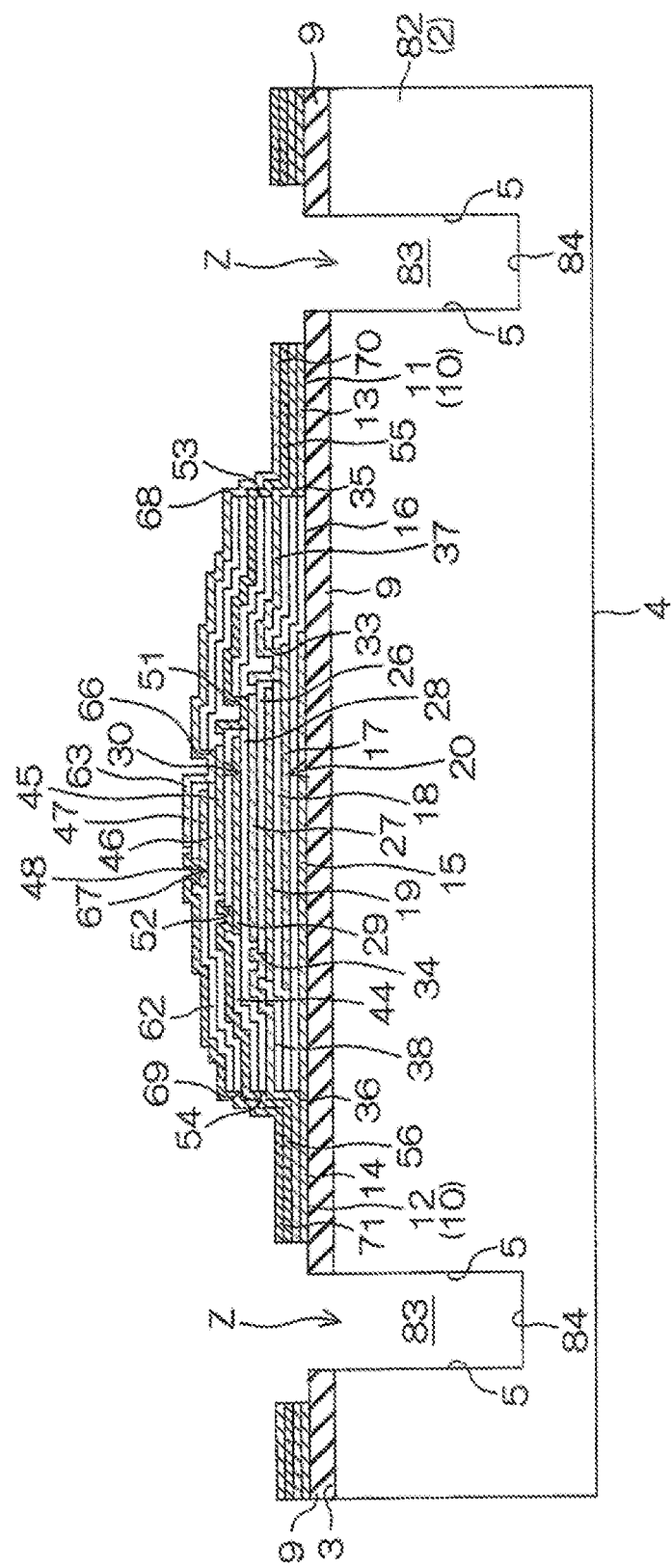
FIG. 6L shows the next step of FIG. 6K.
Figure 6M:
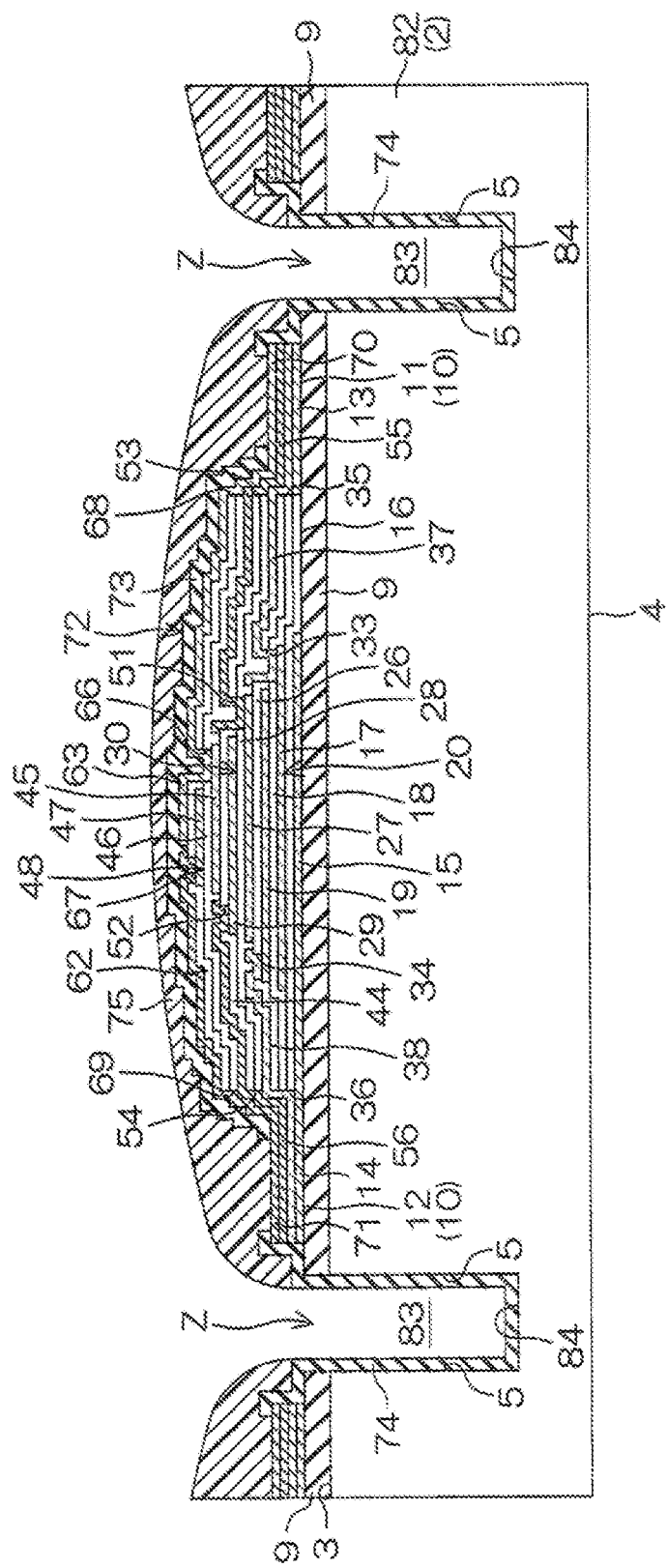
FIG. 6M shows the next step of FIG. 6L.
Figure 6N:
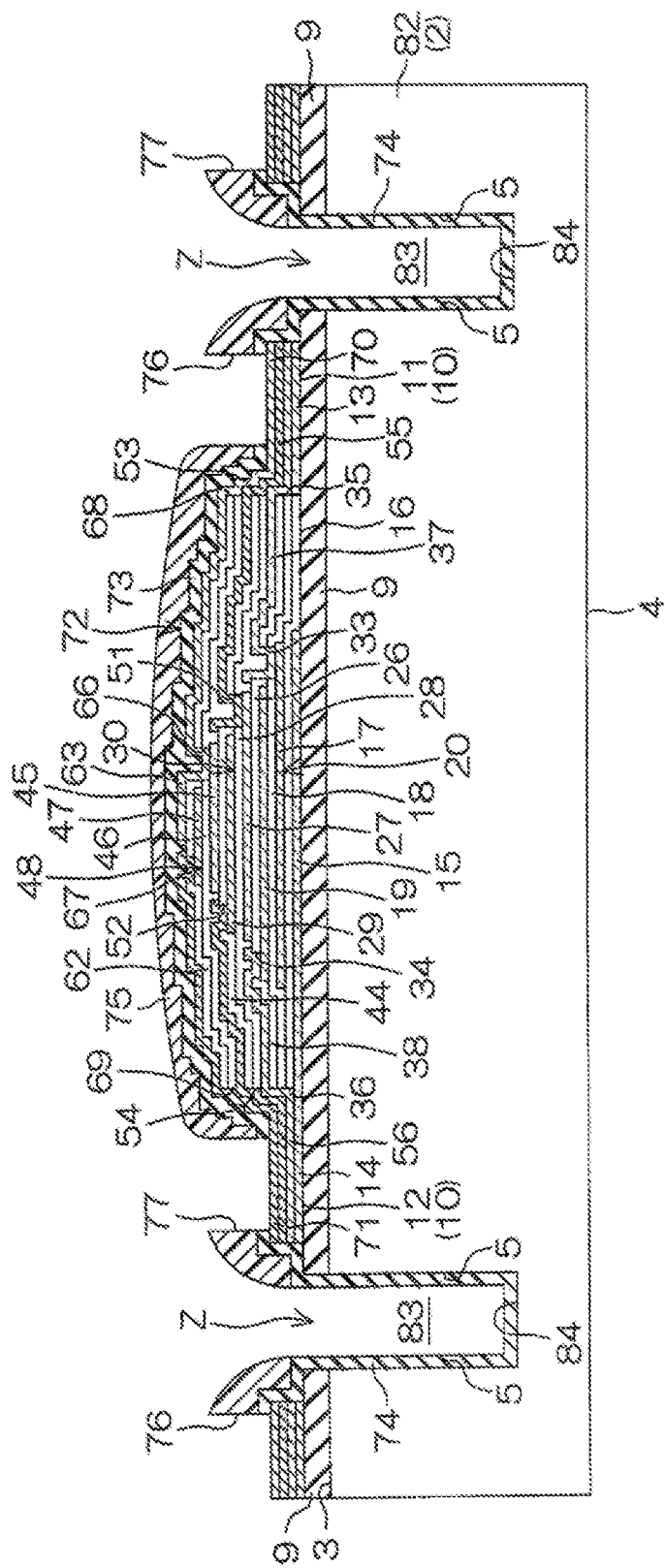
FIG. 6N shows the next step of FIG. 6M.
Figure 60:
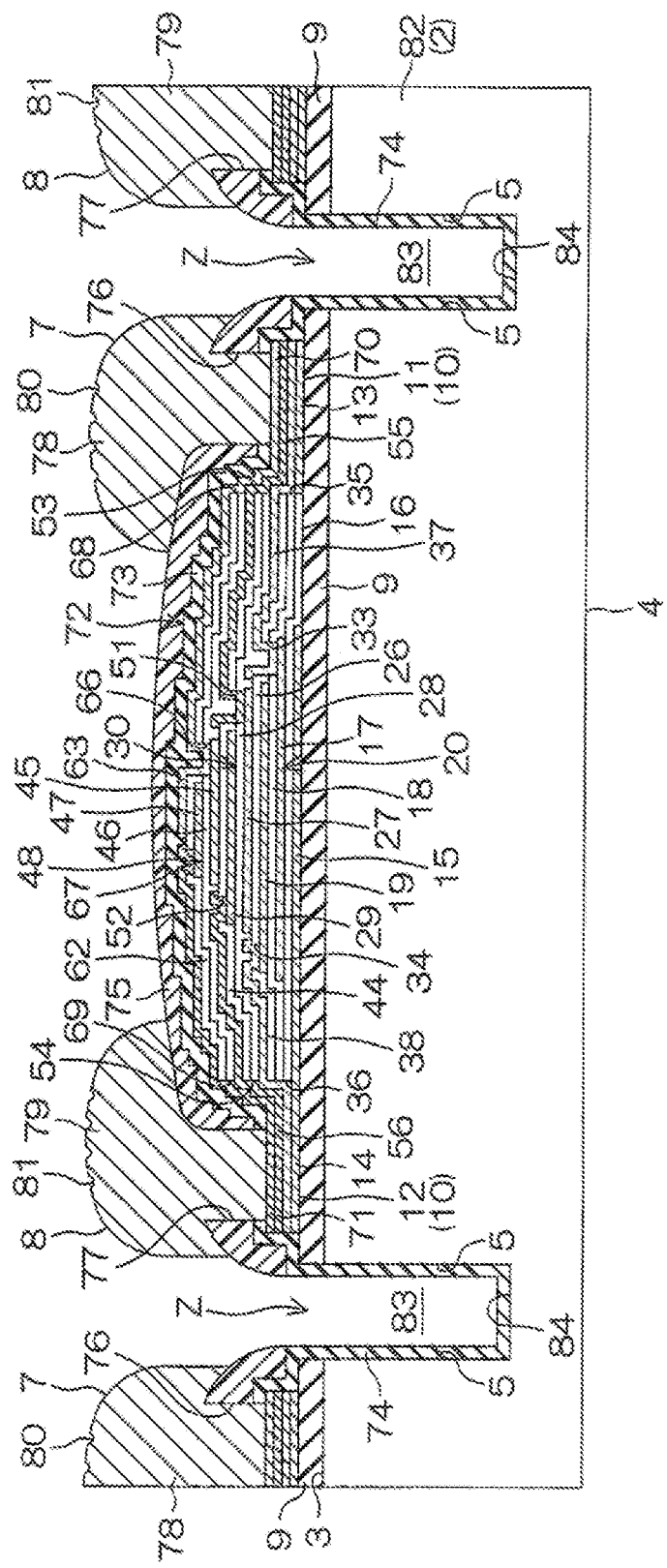
Figure 6P:
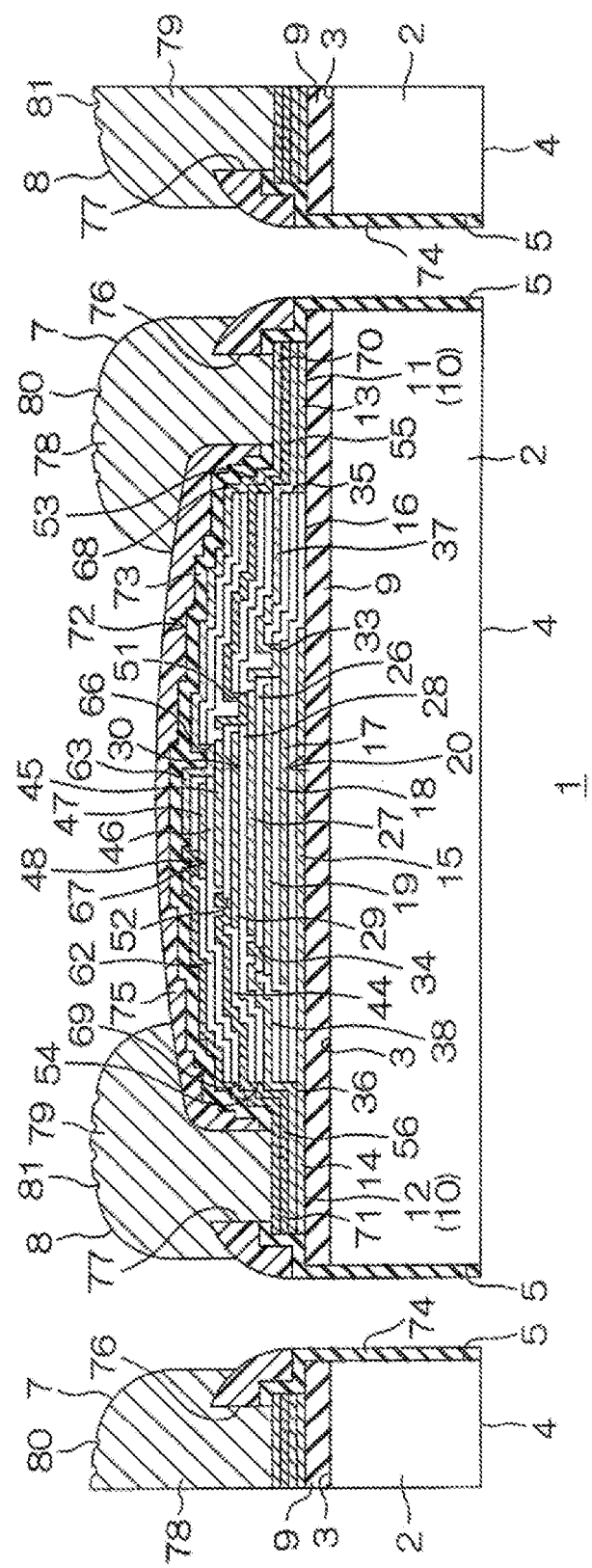
FIG. 6P shows the next step of FIG. 6O.

FIG. 6A~FIG. 6P are diagrams illustrative of the steps of the manufacturing process of the chip capacitor 1 consecutively. Furthermore, for the sake of clarity and conciseness, FIG. 6A~FIG. 6P show only the reference numeral of any constituent element both depicted in the FIG. 1~FIG. 5 and required for description of any step of the manufacturing process but omit the other reference numerals. FIG. 6A~FIG. 6P are not cross-sectional views illustrative of FIG. 2 and taken at any specific point thereof.

To manufacture the chip capacitor 1, first, as shown in FIG. 6A, a wafer 82, which the substrate 2 is based on, is provided. Then, for example, the first side 3 of the wafer 82 undergoes thermal oxidation to form the insulating layer 9.

As shown in FIG. 6B, a material of the first conductive layer 10 is formed on the entire surface of the insulating layer 9, for example, by sputtering. After that, patterning the insulating layer 9 by photolithography and dry etching, such as RIE (reactive ion etching). Therefore, the first conductive layer 10 is formed on the insulating layer 9 to selectively remove a portion of the material film.

As shown in FIG. 6C, for example, CVD (chemical vapor deposition) is performed such that a material of the first insulating layer 16 is formed to cover the first conductive layer 10 and thereby covering throughout the first side 3 of the wafer 82.

Subsequently, a material of the first lower electrode 17 is formed on the entire surface of the first insulating layer 16, for example, by sputtering. Then, patterning the first insulating layer 16 by photolithography and dry etching, such as RIE (reactive ion etching) to selectively remove a portion of the material film. By such operations, the first lower electrode 17 is formed on the first insulating layer 16.

Next, for example, CVD (chemical vapor deposition) is performed such that a material of the first dielectric layer 18 is formed cover the first lower electrode 17 and thereby covering throughout the first side 3 of the wafer 82.

Then, a material of the first upper electrode 19 is formed on the entire surface of the first dielectric layer 18, for example, by sputtering. Next, patterning the first dielectric layer 18 by photolithography and dry etching, such as RIE (reactive ion etching) to selectively remove a portion of the material film. Therefore, the first upper electrode 19 is formed on the first dielectric layer 18.

Afterward, for example, CVD (chemical vapor deposition) is performed such that a material of the second insulating layer 26 is formed to cover the first upper electrode 19 and thereby covering throughout the first side 3 of the wafer 82.

As shown in FIG. 6D, by photolithography and dry etching, such as RIE (reactive ion etching), the second insulating layer 26, first dielectric layer 18 and first insulating layer 16 are selectively removed and thereby patterned. Thereby, the first contact via 33, second contact via 34, third contact via 35 and fourth contact via 36 are simultaneously formed.

As shown in FIG. 6E, a material of a second conductive layer (including the second lower electrode 27, first wiring portion 37 and second wiring portion 38) is formed on the entire surface of the second insulating layer 26, for example, by sputtering. Then, the material film is selectively removed and thereby pattered by photolithography and dry etching, such as RIE (reactive ion etching). Therefore, the second lower electrode 27, first wiring portion 37 and second wiring portion 38 are simultaneously formed on the second insulating layer 26. Therefore, the first wiring portion 37 is connected to the first lower electrode 17 through the first contact via 33 and connected to the first pad 13 through the third contact via 35. The second wiring portion 38 is connected to the first upper electrode 19 through the second contact via 34 and connected to the second pad 14 through the fourth contact via 36.

As shown in FIG. 6F, for example, CVD (chemical vapor deposition) is performed such that a material of the second dielectric layer 28 is formed to cover the second lower electrode 27 and thereby covering throughout the first side 3 of the wafer 82.

Next, a material of the second upper electrode 29 is formed on the entire surface of the second dielectric layer 28, for example, by sputtering. After that, the material film is selectively removed and thereby patterned by photolithography and dry etching, such as RIE (reactive ion etching). Therefore, the second upper electrode 29 is formed on the second dielectric layer 28.

Then, for example, CVD (chemical vapor deposition) is performed such that a material of the third insulating layer 44 is formed to cover the second upper electrode 29 and thereby covering throughout the first side 3 of the wafer 82.

As shown in FIG. 6G, the third insulating layer 44 and second dielectric layer 28 are selectively removed and thereby patterned by photolithography and dry etching, such as RIE (reactive ion etching). Therefore, the fifth contact via 51, sixth contact via 52, seventh contact via 53 and eighth contact via 54 are simultaneously formed.

As shown in FIG. 6H, a material of a third conductive layer (the third lower electrode 45, third wiring portion 55 and fourth wiring portion 56) is formed on the entire surface of the third insulating layer 44, for example, by sputtering. Next, the material film is selectively removed and thereby patterned by photolithography and dry etching, such as RIE (reactive ion etching). Therefore, the third lower electrode 45, third wiring portion 55 and fourth wiring portion 56 are simultaneously formed on the third insulating layer 44. Therefore, the third wiring portion 55 is connected to the second lower electrode 27 through the fifth contact via 51 and connected to the first wiring portion 37 through the seventh contact via 53. The fourth wiring portion 56 is connected to the second upper electrode 29 through the sixth contact via 52 and connected to the second wiring portion 38 through the eighth contact via 54.

As shown in FIG. 6I, for example, CVD (chemical vapor deposition) is performed such that a material of the third dielectric layer 46 is formed to cover the third lower electrode 45 and thereby covering throughout the first side 3 of the wafer 82.

After that, a material of the third upper electrode 47 is formed on the entire surface of the third dielectric layer 46, for example, by sputtering. Next, the material film is selectively removed and thereby patterned by photolithography and dry etching, such as RIE (reactive ion etching). Therefore, the third upper electrode 47 is formed on the third dielectric layer 46.

Next, for example, CVD (chemical vapor deposition) is performed such that a material of the fourth insulating layer 62 is formed to cover the third upper electrode 47 and thereby covering throughout the first side 3 of the wafer 82.

As shown in FIG. 6J, the fourth insulating layer 62 and third dielectric layer 46 are selectively removed and thereby patterned by photolithography and dry etching, such as RIE (reactive ion etching). Therefore, the ninth contact via 66, the tenth contact via 67, the eleventh contact via 68 and the twelfth contact via 69 are simultaneously formed.

As shown in FIG. 6K, a material of the uppermost conductive layer 63 (including the fifth wiring portion 70 and sixth wiring portion 71) is formed on the entire surface of the fourth insulating layer 62, for example, by sputtering. Then, the material film is selectively removed and thereby patterned by photolithography and dry etching, such as RIE (reactive ion etching). Therefore, the uppermost conductive layer 63, fifth wiring portion 70 and sixth wiring portion 71 are simultaneously formed on the fourth insulating layer 62. Therefore, the fifth wiring portion 70 is connected to the third lower electrode 45 through the ninth contact via 66 and connected to the third wiring portion 55 through the eleventh contact via 68. The sixth wiring portion 71 is connected to the third upper electrode 47 through the tenth contact via 67 and connected to the fourth wiring portion 56 through the twelfth contact via 69.

As shown in FIG. 6L, the wafer 82 is selectively removed by plasma etching in wherein a photoresist patter (not shown) is configured as a mask. Therefore, the material of the wafer 82 is removed from boundary region Z between adjacent component regions (regions where chip capacitors 1 are formed), thereby forming a recess 83 of a specific depth which starts from the first side 3 of the wafer 82 and ends at the middle of the thickness of the wafer 82. The recess 83 is defined by a pair of opposite lateral sides (the third sides 5 of the chip capacitor 1) and a bottom side 84 connected between lower ends (the ends on the side of the second side 4 of the wafer 82) of the pair of third sides 5. For example, if the recess 83 has a depth of around 100 μm measured with reference made to the first side 3 of the wafer 82 and a width (the distance between the third sides 5 disposed opposite to each other) of around 20 μm, the depth direction over the entire wafer 82 can optionally be fixed.

As shown in FIG. 6M, for example, CVD (chemical vapor deposition) is performed such that a material of the surface insulating film 72 is formed to cover the first capacitor unit 20, second capacitor unit 30 and third capacitor unit 48 and thereby covering throughout the first side 3 of the wafer 82. Hence, the surface insulating film 72 is formed on the whole of the inner surface (including the third side 5 and the bottom side 84) of the recess 83.

After that, a material (for example, liquid polyimide-containing photosensitive resin) of the surface protective film 75 is sprayed-coated to the wafer 82 from above the surface insulating film 72, as shown in FIG. 6M, to form the surface protective film 75 of photosensitive resin. At this point, in order to prevent the liquid from entering the recess 83, the liquid is coated on the wafer 82 through a mask (not shown) having pattern covering only the recess 83 from a top-view perspective. As a result, the liquid photosensitive resin is formed only on the wafer 82 to become the surface protective film 75 on the wafer 82.

Therefore, since the liquid does not enter the recess 83, the surface protective film 75 is not formed inside the recess 83. In addition to spray-coating liquid photosensitive resin, the surface protective film 75 can alternatively be formed by spin-coating the liquid and/or adhering a sheet which includes photosensitive resin to the first side 3 of the wafer 82.

Thermal treatment (cure treatment) is performed on the surface protective film 75. Therefore, the surface protective film 75 undergoes thermal contraction in its thickness dimension, whereas the surface protective film 75 becomes rigid and stable in film quality.

As shown in FIG. 6N, for example, the surface protective film 75 is selectively removed and thereby patterned by photolithography and dry etching, such as RIE (reactive ion etching). Therefore, the first pad opening 76 and the second pad opening 77 can be simultaneously formed to expose the fifth wiring portion 70 and sixth wiring portion 71.

After that, by selectively etching the exposed fifth wiring portion 70 and the exposed sixth wiring portion 71, a plurality of dents identical with the dents 80, 81 of the first external electrode 7 and the second external electrode 8 may be formed on the surface of the fifth wiring portion 70 and the surface of the sixth wiring portion 71.

As shown in FIG. 6O, for example, Ni, Pd and Au are laminated together by electroless plating such that the first external electrode 7 and the second external electrode 8 are simultaneously formed.

As shown in FIG. 6P, the wafer 82 is ground from the second side 4 by a grinding process. After the recess 83 has been formed, for example, a panel including PET (polyethylene terephthalate) and a carrier tape (not shown) with an adhesion surface are adhered to the lateral side (i.e., the first side 3) of the second external electrode 8 and the first external electrode 7. Then, with the wafer 82 being supported by the carrier tape, the wafer 82 is ground from the second side 4. By the grinding process, the wafer 82 is thinned down to the bottom side 84 of the recess 83, and thus the portion which connects the adjacent chip capacitors 1 vanishes; hence, the wafer 82 is separated where recess 83 serves as boundary, thus become the final products of the chip capacitors 1. Alternatively stated, the wafer 82 is cut (divided) at the recess 83 (i.e., boundary region Z) to thereby produce the chip capacitors 1. Alternatively, the chip capacitors 1 can also be divided by etching the wafer 82 from the second side 4 to the bottom side 84 of the recess 83.

Alternatively, the second side 4 of the substrate 2 in the finished chip capacitor 1 is ground or etched so as to become mirror surface (i.e. glossy and flat).

Therefore, according to an embodiment of the present disclosure, the first contact via 33, second contact via 34, third contact via 35 and fourth contact via 36 are simultaneously formed when the first capacitor unit 20 to be formed. Therefore, the number of the steps of the manufacturing process is minimized despite an increase in the number of the conductive layers and insulating layers on the substrate 2. This is also the case when the second capacitor unit 30 and third capacitor unit 48 are formed. Conventionally, it is needed to increase the number of the manufacturing steps by three, for example, performing photolithography-→etching→striping the photoresist in response to an increase in the layer number by one. By contrast, the method of the present disclosure addressed with the aforesaid need, alleviating the increase of required processing steps.

An embodiment of the present disclosure is described above; however, the present disclosure may also be implemented in any other way.

For example, in the embodiment, three capacitor units, namely the first capacitor unit 20, second capacitor unit 30 and third capacitor unit 48, are formed on the substrate 2, but the present invention may also be implemented otherwise, for example, by forming only the first capacitor unit 20 or forming at least four capacitor units.

The chip capacitor 1, for example, is implemented as a circuit component for use in a power circuit, high-frequency circuit, and digital circuit and mounted in a mobile terminal, such as an electronic device or portable electronic device.

Various design changes may be made to the chip capacitor 1 without departing from the scope of the appended claims.

NUMERICAL TAGS IN THE DRAWINGS 1 chip capacitor
2 substrate
3 first side
4 second side
5 third side
6 corner
7 first external electrode
8 second external electrode
9 insulating layer
10 first conductive layer
11 first portion
12 second portion
13 first pad
14 second pad
15 capacitor region
16 first insulating layer
17 first lower electrode
18 first dielectric layer
19 first upper electrode
20 first capacitor unit
21 first capacitor region
22 first connection region
23 third capacitor region
24 first extension portion
25 second extension portion
26 second insulating layer
27 second lower electrode
28 second dielectric layer
29 second upper electrode
30 second capacitor unit
31 second capacitor region
32 second connection region
33 first contact via
34 second contact via
35 third contact via
36 fourth contact via
37 first wiring portion
38 second wiring portion
39 fourth capacitor region
40 fourth connection region
41 fifth capacitor region
42 third extension portion
43 fourth extension portion
44 third insulating layer
45 third lower electrode
46 third dielectric layer
47 third upper electrode 48 third capacitor unit
49 sixth capacitor region
50 sixth connection region
51 fifth contact via
52 sixth contact via
53 seventh contact via
54 eighth contact via
55 third wiring portion
56 fourth wiring portion
57 seventh capacitor region
58 seventh connection region
59 eighth capacitor region
60 fifth extension portion
61 sixth extension portion
62 fourth insulating layer
63 uppermost conductive layer
64 ninth capacitor region
65 ninth connection region
66 ninth contact via
67 tenth contact via
68 eleventh contact via
69 twelfth contact via
70 fifth wiring portion
71 sixth wiring portion
72 surface insulating film
73 first portion
74 second portion
75 surface protective film
76 first pad opening
77 second pad opening
78 first protruding portion
79 second protruding portion
80 dent
81 dent
82 wafer
83 recess
84 bottom side

What is claimed is:

1. A chip capacitor, comprising:
a substrate;
a first conductive layer formed on the substrate and comprising a first pad and a second pad which are separated from each other;
a first insulating layer covering the first conductive layer;
a first capacitor unit over the first insulating layer and positioned in a capacitor region between the first pad and the second pad, comprising:
a first lower electrode;
a first dielectric layer covering the first lower electrode; and
a first upper electrode over the first dielectric layer;
a second insulating layer over the first capacitor unit and covering the first upper electrode;
a second conductive layer over the second insulating layer and comprising:
a first wiring portion penetrating the second insulating layer and the first dielectric layer to be connected to the first lower electrode and penetrating the second insulating layer, the first dielectric layer and the first insulating layer to be connected to the first pad; and
a second wiring portion penetrating the second insulating layer to be connected to the first upper electrode and penetrating the second insulating layer, the first dielectric layer and the first insulating layer to be connected to the second pad;
a first external electrode disposed on the first pad and electrically connected to the first wiring portion; and
a second external electrode disposed on the second pad and electrically connected to the second wiring portion, wherein at least one of the first external electrode and the second external electrode has an upper surface comprising a plurality of dents recessing toward a surface of the substrate.

2. The chip capacitor of claim 1, wherein the first lower electrode comprises:
a first capacitor region facing the first upper electrode; and
a first connection region extending from the first capacitor region toward a first direction parallel to a surface of the substrate, wherein the first wiring portion is connected to the first connection region.

3. The chip capacitor of claim 2, wherein the first upper electrode comprises: a second capacitor region facing the second conductive layer; and a second connection region extending from the second capacitor region toward a second direction opposite to the first direction, wherein the second wiring portion is connected to the second connection region.

4. The chip capacitor of claim 3, wherein the first capacitor region of the first lower electrode has an area greater than the second capacitor region of the first upper electrode.

5. The chip capacitor of claim 1, further comprising:
a second capacitor unit comprising:
a second lower electrode including a portion of the second conductive layer;
a second dielectric layer covering the second lower electrode; and
a second upper electrode over the second dielectric layer;
a third insulating layer over the second capacitor unit and covering the second upper electrode; and
a third conductive layer over the third insulating layer, comprising:
a third wiring portion penetrating the third insulating layer and the second dielectric layer to be connected to the second lower electrode, and penetrating the third insulating layer and the second dielectric layer to be connected to the first wiring portion; and
a fourth wiring portion penetrating the third insulating layer to be connected to the second upper electrode and penetrating the third insulating layer and the second dielectric layer to be connected to the second wiring portion.

6. The chip capacitor of claim 5, wherein the first wiring portion of the first capacitor unit and the third wiring portion of the second capacitor unit are configured to be not overlapping when viewed in a third direction perpendicular to a surface of the substrate.

7. The chip capacitor of claim 5, wherein the second wiring portion of the first capacitor unit and the fourth wiring portion of the second capacitor unit are configured to be not overlapping when viewed in a third direction perpendicular to a surface of the substrate.

8. The chip capacitor of claim 1, wherein the dents are arranged in a matrix.

9. The chip capacitor of claim 1, further comprising a surface insulating film on a surface of the substrate covering the second conductive layer and integrally covering a lateral side of the substrate.

10. The chip capacitor of claim 9, further comprising a surface protective film covering the surface insulating film on the surface of the substrate, wherein each of the first external electrode and the second external electrode comprise a first protrusion and a second protrusion protruding from a surface of the surface protective film.

11. The chip capacitor of claim 10, wherein, when viewed in a third direction perpendicular to the surface of the substrate, the first protrusion and the second protrusion are configured to cover a lamination structure of the first insulating layer, the first dielectric layer and the second insulating layer and extend from above the first pad and the second pad, respectively, to an inner region of the substrate.

12. The chip capacitor of claim 10, wherein the surface insulating film is $SiO_2$ film or SiN film, and the surface protective film is polyimide film.

13. The chip capacitor of claim 1, wherein the first external electrode and the second external electrode each comprise a plating layer formed by plating growth.

\* \* \* \* \*